United States Patent [19]

Jangbarwala et al.

[11] Patent Number: 5,718,828
[45] Date of Patent: Feb. 17, 1998

[54] METHOD FOR MINIMIZING WASTEWATER DISCHARGE

[75] Inventors: Juzer Jangbarwala, Chino Hills; Charles F. Michaud, Fullerton, both of Calif.

[73] Assignee: Hydromatix Inc., Chino, Calif.

[21] Appl. No.: 592,803

[22] Filed: Jan. 26, 1996

[51] Int. Cl.⁶ ............................................. B01J 49/00
[52] U.S. Cl. ................................... 210/677; 521/26
[58] Field of Search ................... 210/662, 669, 210/677, 685, 694, 269, 274, 275, 284, 900; 521/26

[56] References Cited

U.S. PATENT DOCUMENTS

| | | | |
|---|---|---|---|
| 2,754,261 | 7/1956 | Akeroyd | 210/677 |
| 2,938,868 | 5/1960 | Carlson et al. | 210/662 |
| 3,455,819 | 7/1969 | Crits | 210/274 |
| 3,531,401 | 9/1970 | Crits | 210/677 |
| 3,985,648 | 10/1976 | Casolo | 210/669 |
| 4,176,056 | 11/1979 | Grier | 210/670 |
| 4,197,195 | 4/1980 | Ochsenfeld et al. | 210/677 |
| 4,652,352 | 3/1987 | Saieva | 204/105 R |
| 4,824,575 | 4/1989 | Schlossel | 210/662 |
| 5,066,371 | 11/1991 | DeVoe et al. | 204/149 |
| 5,156,825 | 10/1992 | Sarma et al. | 423/24 |
| 5,269,936 | 12/1993 | Gussmann et al. | 210/675 |
| 5,352,345 | 10/1994 | Byszewski et al. | 204/182.4 |
| 5,407,564 | 4/1995 | Thrailkill | 210/167 |

FOREIGN PATENT DOCUMENTS

| | | |
|---|---|---|
| 0355966 | 2/1990 | European Pat. Off. . |
| 2732927 | 8/1978 | Germany . |
| 3005249A1 | 8/1981 | Germany . |
| 54-14366 | 5/1977 | Japan . |

*Primary Examiner*—Ivars Cintins
*Attorney, Agent, or Firm*—Knobbe, Martens, Olson & Bear, LLP

[57] ABSTRACT

A method for minimizing wastewater discharge generated in an ion exchange regeneration system having a cation exchange bed and an anion exchange bed, which method is characterized in that all of the segments of regenerant and displacement rinse are recirculated in a common loop, and shifted forward by one position, whereby the first segment is discarded in the subsequent cycle, and the last segment in the subsequent cycle is provide by fresh rinse, while chemicals are added as necessary, and in final rinse cycle, rinse flows through the cation exchange bed and the anion exchange bed in series, and recirculates in a loop, thereby eliminating over 90% of waste.

22 Claims, 20 Drawing Sheets

METHOD FOR MINIMIZING WASTEWATER DISCHARGE

BACKGROUND

1. Field of the Invention

This invention relates to a method and apparatus for a regeneration system for ion exchange beds used in deionization or demineralization of rinses such as circuit board rinses, aqueous cleaner rinses, plating/anodizing rinses, and tap water deionization systems, and particularly to that allowing for highly minimizing wastewater discharged from regeneration systems.

2. Background of the Art

Ion exchange technology has long been employed for the effective removal of objectionable ions from solutions. Applications include the exchange of hardness for sodium (softening) of bicarbonates for chlorides (dealkalizing), of cations and anions for hydrogen and hydroxyl ions (demineralization).

Ion exchange technology does facilitate a moderate reduction of volume by concentrating the impurities to be removed from water. Regeneration with brine, acid and/or caustic at 5–10% concentrations can produce spent regenerants containing percent levels of the impurity. This is of particular interest when using ion exchange to remove heavy metal contaminants from metal plating rinse streams. Upon regeneration, the contaminant ions, such as copper and nickel, are contained in percent concentrations instead of ppm concentrations and with a corresponding reduction in volume.

However, chemical regeneration increases the total solids of the waste chemicals to ultimately be disposed of. In fact, the total solids can be increased by a factor of three or more unless controls are employed to reduce the waste chemical volume containing the objectionable ions. In addition, the liquid volume of regenerant waste can exceed 15 Bed Volumes (BV) following normal backwash, chemical draw and rinsing steps.

There are several new developments that can be employed to reduce the liquid volume of regenerants. These are of significance if the waste is a non-dischargeable or hazardous material such as heavy metal salts. Approaching a "zero" liquid discharge involves the subsequent separation of the solids and liquids. The lower the volume, the lower the cost of treatment.

In conventional regeneration of ion exchanges, the bed is first backwashed to loosen dirt and debris and redistribute the resins for better flow without channeling. Backwash flows for cation exchangers are typically 6 gpm per $ft^2$ of bed area. For a typical three foot bed depth recommended by manufacturers, this mounts to 2 gpm/$ft^3$. A backwash conducted for 20 minutes would therefore produce 40 gallons of waste water per cubic foot of resin. For anion exchangers, the flow is less because of the lower density. Nonetheless, approximately 15 gallons of waste are spent per cubic foot of resin.

Chemical draw, the next step in regeneration is typically carried out at concentrations of 4–6% or approximately 0.50 lbs (active) per gallon. With regenerant levels of 6–8 lbs/$ft^3$, an average of 15 gallons of waste are produced.

The next step is the displacement rinses to propel the regenerant through the beds. These rinse volumes are typically 2–3 BV or 15–20 gallons/$ft^3$. Following the displacement rinse, a rapid rinse is employed at full flow to purge the residual regenerants from the system and prepare the bed for next cycle. This is referred to as the quality rinse and can average 30 minutes for each resin at 2 gpm/$ft^3$. A typical cycle therefore generates the regeneration waste consisting of the following:

|  | CATION | ANION |
| --- | --- | --- |
| Backwash | 40 gals. | 15 gals. |
| Chemical Draw | 15 gals. | 15 gals. |
| Displacement | 20 gals. | 20 gals. |
| Quality Rinse | 60 gals. | 60 gals. |
| TOTAL | 135 gals. | 110 gals. |

(1 Bed Volume = 7.5 gals = 1 $ft^3$)

Hence the regeneration waste total for a conventional system typically add up to 18 BV for a cation, and 14.7 BV for an anion.

Prior attempts to reduce waste volume have employed reuse of regenerants. U.S. Pat. No. 5,352,345 to Byszewski et al discloses a method in which exhausted regenerating solutions from either a cationic or anionic exchange column are converted into fresh regenerating solutions by using an electrodialytic water splitter, an acid or base purification unit, or any combination thereof, thereby maximizing recovery of resources (both in fresh regenerants and in make up water), and minimizing the amount of waste which must be discharged.

However, in the above method, the system is designed simply for rejuvenating the spent regenerant, not for minimizing the waste itself created by the ion exchange columns. For the above purpose, the special device, i.e., the electrodialytic water splitter, the acid or base purification unit, or any combination thereof, is used, and the piping system is complicated. Membranes used for electrodialysis are very sensitive to fouling, and if the system is not run continuously, they will foul. Further, even if the amount of waste generated from the regenerant is minimized due to rejuvenation of the spent regenerant, the overall waste in the system cannot be significantly reduced since waste generated from other cycles such as a backwash cycle, displacement cycle, and quality rinse cycle are not reduced (in fact, waste generated from the regenerant is approximately 10% of the total waste).

U.S. Pat. No. 4,652,352 to Carl J. Saieva discloses a process for recovering metals from dilute solution utilizing ion exchange in combination with ammonium salt regeneration solutions. In this process, the rinse is reused following capture of the metals in the ion exchange system thereby closing a first loop of the process, and the regeneration solution which flows in the counter-current direction is reused following electrolytic recovery of the metals in the plating cell, and recovered metals are reused in the electroplating bath, thereby closing second and third loops of the process. As a result, essentially no liquid or solid waste requiring disposal is generated.

However, in the above process, the system is designed simply for removal of metals, not for minimizing the waste itself created by the ion exchange columns. For the above purpose, the special device, i.e., the electrolytic recovery system is used. Further, the system has serious drawbacks, i.e., simple removal of the metals cannot render the water reusable because the solution contains metal salts such as copper chloride, copper sulfate, nickel chloride, and nickel sulfate, and the other half of the metal salts after removal of the metals will keep accumulating, raising the level of dissolved solids in the rinse tanks, and causing serious quality problems. In addition, in the regeneration procedure, no rinse cycle is mentioned, meaning that the regenerant is still in the resin bed. To reuse the resin, the regenerant must be rinsed out of the resin bed. There is no mention of how that rinse would be minimized. Even if the amount of waste generated from the regenerant is minimized due to rejuvenation of the spent regenerant, the overall waste in the process, like the aforesaid method of U.S. Pat. No. 5,352, 345, cannot be significantly reduced since waste generated from other cycles such as a backwash cycle, displacement cycle, and quality rinse cycle are not reduced. Further, the use of ammonia salt regenerant is not advisable for workers due to its fumes.

In addition, Rohm & Haas Amber Hi-Lites No. 120 describes reuse of regenerants. As described, the first third of the regenerant will be overly diluted by the existing water in the resin column and the water in the void volumes between the resin beads. This is sent to waste. The second ⅓, being the most spent, would also be sent to waste. The final ⅓ is suggested for reuse as the first third of the subsequent chemical draw cycles. Thus, the reuse of regenerant is limited to recycling only ⅓ of the entire chemical draw cycle.

SUMMARY OF THE INVENTION

The present invention has exploited a technology to significantly reduce overall waste volume generated in any deionization or demineralization system, regardless of the degree of contamination, including rinsing systems for circuit boards, aqueous cleaning, plating/anodizing, and tap water deionization systems, without the necessity of devices such as an electrodialyzer for rejuvenation of the spent regenerant. An objective of the present invention is to provide a process of reducing the liquid volume waste of ion exchange regenerants to approximately 1 BV per resin, a reduction of over 90% from the conventional systems.

Namely, one important aspect of the present invention is a method for minimizing wastewater discharge generated in an ion exchange regeneration system comprising a cation exchange bed packed with cation exchange resin and an anion exchange bed packed with anion exchange resin, said method comprising the steps of: (a) preparing plural portions of cation regenerant solution in sequence, said portions being numbered from 1 to n, wherein n is an integer >1; (b) backwashing and regenerating said cation exchange bed with the first portion of cation regenerant solution by introducing said portion to said cation exchange bed in an up-flow direction at a rate sufficient to reclassify said resin accommodated in said bed and to regenerate said resin; (c) further regenerating said cation exchange bed by introducing in sequence each portion of cation regenerant solution thereto in an up-flow direction, whereby the effluent of the first portion of cation regenerant solution is expelled from said cation exchange bed and separated from the regeneration cycle; (d) saving the effluent of each portion, except the first portion, of cation regenerant solution to be used as a portion of cation regenerant solution in the subsequent cycle in such a way that portion number m is saved to be used as portion number m−1 (m minus one) in the subsequent cycle, wherein $2 \leq m \leq n$; (e) preparing a displacement rinse; (f) displacing the cation regenerant solution present in said cation exchange bed with said displacement rinse by introducing said displacement rinse to said cation exchange bed in an up-flow direction, and saving part of the effluent of said displacement rinse to be used as part of the displacement rinse in the subsequent cycle; (g) preparing plural portions of anion regenerant solution in sequence, said portions being numbered from 1 to n', wherein n' is an integer >1; (h) backwashing and regenerating said anion exchange bed with the first portion of anion regenerant solution by introducing said portion to said anion exchange bed in an up-flow direction at a rate sufficient to reclassify said resin accommodated in said bed and to regenerate said resin; (i) further regenerating said anion exchange bed by introducing in sequence each portion of anion regenerant solution thereto in an up-flow direction, whereby the effluent of the first portion of anion regenerant solution is expelled from said anion exchange bed and separated from the regeneration cycle; (j) saving the effluent of each portion of anion regenerant solution to be used as a portion of anion regenerant solution in the subsequent cycle in such a way that portion number m' is saved to be used as portion number m'−1 (m' minus one) in the subsequent cycle, wherein $2 \leq m' \leq n'$; (k) preparing a displacement rinse; (l) displacing the anion regenerant solution present in said anion exchange bed with said displacement rinse by introducing said displacement rinse to said anion exchange bed in an up-flow direction, and saving part of the effluent of said displacement rinse to be used as part of the displacement rinse in the subsequent cycle, wherein steps (a) through (f) are performed prior to, simultaneously with or after steps (g) through (l); (m) circulating final rinse through said cation exchange bed and said anion exchange bed in series in a down-flow direction; and (n) recirculating said final rinse until the quality of rinse discharged from either cation or anion exchange bed reaches a predetermined level. In a preferred embodiment of the above method, for the cation exchange bed, step (k) comprises preparing plural portions of displacement rinse, said portions being numbered from 1 to q', wherein q' is an integer >1, in which portion number q is provided by fresh rinse; and wherein step (l) comprises: (i) displacing the anion regenerant solution present in said anion exchange bed with said displacement rinse by introducing each portion in sequence to said anion exchange bed in an up-flow direction, (ii) saving the effluent of the first portion of displacement rinse to be used as the last portion of anion regenerant solution in the subsequent cycle, the concentration of said last portion of anion regenerant solution being adjusted, and (iii) saving the effluent of each of the remaining portions of displacement rinse to be used as a portion of displacement rinse in the subsequent cycle in such a way that portion number p' is saved to be used as portion number p'−1 (p' minus 1) in the subsequent cycle, wherein $2 \leq p' \leq q'$. For the anion exchange bed, steps (k) and (l) are preferably performed in the same manner as steps (e) and (f), respectively. The above method is based on up-flow regeneration, i.e., counter-current regeneration if service flow is down-flow. According to the above method, over 90% of wastewater conventionally discharged from regeneration systems can be reduced.

Another important aspect of the present invention is based on down-flow regeneration, i.e., counter-current regeneration if service flow is up-flow. This is a method for minimizing wastewater discharge generated in an ion exchange regeneration system comprising a cation exchange bed accommodating cation exchange resin and an anion exchange bed accommodating anion exchange resin, said method comprising the steps of: (a) backwashing said cation and anion exchange beds by circulating backwash rinse through said cation and anion exchange beds in an up-flow direction, and recirculating said backwash rinse; (b) preparing plural portions of cation regenerant solution in sequence, said portions being numbered from 1 to n, wherein n is an integer >1; (c) regenerating said cation exchange bed with the first portion of cation regenerant solution by introducing said portion to said cation exchange bed from an upper part of the resin accommodated therein in a down-flow direction, whereby the backwash rinse remaining in said cation exchange bed is expelled therefrom and separated from the regeneration cycle; (d) further regenerating said cation exchange bed by introducing in sequence each portion of cation regenerant solution thereto in a down-flow direction, whereby the effluent of the first portion of cation regenerant solution is expelled from said bed and separated from the regeneration cycle; (e) saving each portion of cation regenerant solution to be used as a portion of cation regenerant solution in the subsequent cycle in such a way that portion number m is saved to be used as portion number m−1 (m minus one) in the subsequent cycle, wherein $2 \leq m \leq n$; (f) preparing a displacement rinse; (g) displacing the cation regenerant solution present in said cation exchange bed with said displacement rinse by introducing said displacement rinse to said cation exchange bed in a down-flow direction, and saving part of the effluent of said displacement rinse to be used as part of the displacement rinse in the subsequent cycle; (h) preparing plural portions of onion regenerant solution in sequence, said portions being numbered from 1 to n', wherein n' is an integer >1; (i) regenerating said anion exchange bed with the first portion of anion regenerant solution by introducing said portion to said anion exchange bed from an upper part of the resin accommodated therein in a down-flow direction, whereby the backwash rinse remaining in said anion exchange bed is expelled therefrom and separated from the regeneration cycle; (j) further regenerating said anion exchange bed by introducing in sequence each portion of anion regenerant solution thereto in a down-flow direction, whereby the effluent of the first portion of anion regenerant solution is expelled from said bed and separated from the regeneration cycle; (k) saving each portion of anion regenerant solution to be used as a portion of anion regenerant solution in the subsequent cycle in such a way that portion number m' is saved to be used as portion number m'−1 (m' minus one) in the subsequent cycle, wherein $2 \leq m' \leq n'$; (l) preparing a displacement rinse; (m) displacing the anion regenerant solution present in said anion exchange bed with said displacement rinse by introducing said displacement rinse to said anion exchange bed in a down-flow direction, and saving part of the effluent of said displacement rinse to be used as part of the displacement rinse in the subsequent cycle, wherein steps (b) through (g) are performed prior to, simultaneously with or after steps (h) through (m); (n) circulating final rinse through said cation exchange bed and said anion exchange bed in series in a down-flow direction; and (o) recirculating said final rinse until the quality of rinse discharged from either cation or anion exchange bed reaches a predetermined level.

In a preferred embodiment of the above method, for the cation exchange bed, step (f) comprising preparing plural portions of displacement rinse, said portions being numbered from 1 to q, wherein q is an integer >1, in which portion number q is provided by fresh rinse; and wherein step (g) comprising: (I) displacing the cation regenerant solution present in said cation exchange bed with said displacement rinse by introducing each portion in sequence to said cation exchange bed from an upper part of the resin accommodated therein in a down-flow direction; (II) saving the effluent of the first portion of displacement rinse to be used as the last portion of cation regeneration solution in the subsequent cycle, the concentration of said last portion of cation regenerant solution being adjusted; and (III) saving the effluent of each of the remaining portions of displacement rinse to be used as a portion of displacement rinse in the subsequent cycle in such a way that portion number p is saved to be used as portion number p−1 (p minus one) in the subsequent cycle, wherein $2 \leq p \leq q$. For the anion exchange bed, steps (l) and (m) are preferably performed in the same manner as steps (f) and (g), respectively. According to the above method (down-flow regeneration), nearly 90% of wastewater conventionally discharged from regeneration systems can be reduced.

In the above-mentioned methods, i.e., up-flow regeneration and down-flow regeneration, when the ion exchange regeneration system further comprises a filtration device to filter out impurities from the service flow, prior to the regeneration cycle, the necessity of backwash is abated, thereby further reducing the waste volume.

In addition, the methods can readily be adapted to a system which further comprises one or more of the following beds: a metal-selective resin bed preceding said cation exchange bed; a mixed-bed type polisher bed following said anion exchange bed; a weak base anion exchange bed preceding said anion exchange bed; and a weak acid cation exchange bed following said anion exchange bed, wherein the regeneration and displacement steps are performed on said one or more beds, and, in the final rinse step, said final rinse is further circulated through said one or more columns in series.

Another objective of the present invention is to provide an apparatus for efficiently conducting the above methods. Namely, another important aspect of the present invention is an apparatus for a deionization and regeneration system, comprising: (a) a cation exchange bed packed with cation exchange resin; (b) an anion exchange bed packed with anion exchange resin, said anion exchange bed being placed in series with said cation exchange bed; (c) a collection sump for storing water or rinse to be circulated in the apparatus, said collection sump being in connection with said cation exchange bed and said anion exchange bed, so that said water or rinse can be circulated in a loop; (d) plural tanks for storing cation regenerant solution, said tanks being placed in a row and numbered from 1 to n, wherein n is an integer >1, at least tank number n being provided with a chemical injector, each tank being in connection with said cation exchange bed with a common line so that said cation regenerant solution can be circulated in a loop; (e) plural tanks for storing anion regenerant solution, said tanks being placed in a row and numbered from 1 to n, wherein n is an integer >1, at least one of which is provided with a chemical injector, each tank being in connection with said anion exchange bed with a common line so that said anion regenerant solution can be circulated in a loop; (f) at least one tank for storing cation displacement rinse, and one source of fresh rinse, said at least one tank being in parallel to said tanks for storing cation regenerant solution and incorporated in said loop formed by said tanks for storing cation regenerant solution and said cation exchange bed, said at least one tank and said source of fresh rinse being connected to the bottom of said cation exchange bed and being numbered from 1 to q, wherein said source of fresh rinse is numbered q which is an integer >1; (g) at least one tank for storing anion displacement rinse, and one source of fresh rinse, said at least one tank being in parallel to said tanks for storing anion regenerant solution and incorporated in said loop formed by said tanks for storing anion regenerant solution and said anion exchange bed, said at least one tank and said source of fresh rinse being connected to the bottom of said anion exchange bed and being numbered from 1 to q, wherein said source of fresh rinse is numbered q which is an integer >1; (h) a feed compartment leading to an evaporator tank, said feed compartment being placed, downstream of said cation exchange bed, in said loop formed by said tanks for storing cation regenerant solution and said cation exchange bed; (i) a feed compartment leading to an evaporator tank, said feed compartment being placed, downstream of said anion exchange bed, in said loop formed by said tanks for storing anion regenerant solution and said anion exchange bed; (j) an air-purging blower being in connection with the tops of said cation and anion exchange beds; (k) a flow controlling system for backwashing and regenerating, said system capable of controlling the regeneration cycle as follows:

(i) purging the solution present in said cation exchange bed therefrom with air from said air-purging blower;
  (ii) introducing in sequence each portion of cation regenerant solution accommodated in tank numbers 1 through n to said cation exchange bed in an up-flow direction; (iii) discarding the effluent from the portion from tank number 1 to said feed compartment, and moving the effluent from each portion from tank numbers 2 through n, back to tank numbers 1 through n−1 (n minus one) shifted forward by one tank; (iv) introducing in sequence each portion of cation displacement rinse accommodated in tank number 1 through number q of fresh rinse to said cation exchange bed in an up-flow direction; (v) moving effluent from the portion of displacement rinse accommodated in tank number 1 back to tank number n of cation regenerant solution, and moving effluent from each portion of number 2 through number q of fresh rinse, back to tank number 1 through number q−1 (q minus one) shifted forward by one number in the cycle; and (vi) performing steps corresponding to steps (i) to (v) on said anion exchange bed; and (l) a flow controlling system for rinsing, said system capable of controlling the rinsing cycle in such a way as to (vii) circulate final rinse accommodated in said collection sump through said cation exchange bed and said anion exchange bed in series in a down-flow direction.

Still another important aspect of the present invention is an apparatus for a deionization and regeneration system, comprising: (a) a cation exchange bed packed with cation exchange resin; (b) an anion exchange bed packed with anion exchange resin, said anion exchange bed being placed in series with said cation exchange bed; (c) a collection sump for storing water or rinse to be circulated in the apparatus, said collection sump being in connection with said cation exchange bed and said anion exchange bed, so that said water or rinse can be circulated in a loop; (d) plural tanks for storing cation regenerant solution, said tanks being placed in a row and numbered from 1 to n, wherein n is an integer >1, at least one of which is provided with a chemical injector, each tank being in connection with said cation exchange bed with a common line so that said cation regenerant solution can be circulated in a loop; (e) plural tanks for storing anion regenerant solution, said tanks being placed in a row and numbered from 1 to n, wherein n is an integer >1, at least one of which is provided with a chemical injector, each tank being in connection with said anion exchange bed with a common line so that said anion regenerant solution can be circulated in a loop; (f) at least one tank for storing cation displacement rinse, and one source of fresh rinse, said at least one tank being in parallel to said tanks for storing cation regenerant solution and incorporated in said loop formed by said tanks for storing cation regenerant solution and said cation exchange bed, said at least one tank and said source of fresh rinse being connected to the bottom of said cation exchange bed and being numbered from 1 to q, wherein said source of fresh rinse is numbered q which is an integer >1; (g) at least one tank for storing anion displacement rinse, and one source of fresh rinse, said at least one tank being in parallel to said tanks for storing anion regenerant solution and incorporated in said loop formed by said tanks for storing anion regenerant solution and said anion exchange bed, said at least one tank and said source of fresh rinse being connected to the bottom of said anion exchange bed and being numbered from 1 to q, wherein said source of fresh rinse is numbered q which is an integer >1; (h) a feed compartment leading to an evaporator tank, said feed compartment being placed, downstream of said cation exchange bed, in said loop formed by said tanks for storing cation regenerant solution and said cation exchange bed; (i) a feed compartment leading to an evaporator tank, said feed compartment being placed, downstream of said anion exchange bed, in said loop formed by said tanks for storing anion regenerant solution and said anion exchange bed; (j) a flow controlling system for backwashing and regenerating, said system capable of controlling the regeneration cycle as follows:

(i) circulating backwash rinse accommodated in said collection sump through said cation and anion exchange beds in an up-flow direction; (ii) introducing in sequence each portion of cation regenerant solution accommodated in tank numbers 1 through n to said cation exchange bed in a down-flow direction;
  (iii) moving the effluent from the portion from tank number 1 to said feed compartment after the backwash rinse remaining in said cation exchange bed is pushed back to said collection sump, and moving the effluent from each portion from tank numbers 2 through n, back to tank numbers 1 through n−1 (n minus one) shifted forward by one tank; (iv) introducing in sequence each portion of cation displacement rinse accommodated in tank numbers 1 through number q of fresh rinse to said cation exchange bed in a down-flow direction; (v) moving the effluent from the portion of displacement rinse accommodated in tank number 1 back to tank number n of cation regenerant solution, and moving the effluent from each portion from tank number 2 through number q of fresh rinse, back to tank number 1 through number q−1 (q minus one) shifted forward by one tank; (vi) performing steps corresponding to steps (i) to (v) on said anion exchange bed; and (k) a flow controlling system for rinsing, said system capable of controlling the rinsing cycle in such a way as to (vii) circulate final rinse accommodated in said collection sump through said cation exchange bed and said anion exchange bed in series in a down-flow direction.

When the above apparatus further comprises a filtration device to filter out impurities from the service flow, downstream of the collection sump, the necessity of backwash is abated, thereby further reducing the waste volume. The apparatus is preferably provided with a conductivity monitor downstream of said anion exchange bed, so that the timing of discontinuing regeneration can be appropriately determined. The apparatus preferably comprises a granular activated carbon bed for removal of organics. In addition, the apparatus can comprise one or more of the following beds: a metal-selective resin bed preceding said cation exchange bed; a mixed-bed type polisher bed following said anion exchange bed; a weak base anion exchange bed preceding said cation exchange bed; and a weak acid cation exchange bed following said anion exchange bed, and wherein said one or more beds are incorporated in the apparatus so that regeneration steps can be performed, and final rinse is further circulated through said one or more beds in series.

In the above method and apparatus of the present invention, in the regeneration cycle, irrespective of whether regeneration is counter-current or co-current, all of the segments of the regenerant and the displacement rinse are recirculated in a common loop, and shifted forward by one place in the subsequent cycle, whereby the first segment is discarded in the subsequent cycle, and the last segment in the subsequent cycle is provide by fresh rinse, while chemicals are added as necessary (progressive displacement cycle). In this way, waste can be drastically minimized. Further, in the final rinse cycle, rinse flows through the cation exchange bed and the anion exchange bed in series, and recirculates in a loop, wherein deionized water is produced in each bed by using opposite ion, thereby performing the final rinse without discarding any rinse (internal rinse cycle). Hitherto, typical ion exchange systems produced significant amounts of waste when they regenerated. By using the regeneration system of the present invention, 90% of the generated waste can be eliminated. The wastewater finally discharged in the present invention contains the impurities removed in the service cycle, and can either be concentrated further by evaporation and or treated by conventional hydroxide precipitation. The residue from evaporation and the precipitate from hydroxide precipitation can be sent to metal recyclers due to the hight metal content. The effluent from the precipitation process would meet the discharge limits set by the Environmental Protection Agency (EPA), i.e., the discharge limits on the concentration of various metals in waste streams.

DETAILED DESCRIPTION OF THE PREFERRED EMBODIMENTS

Figure 1:
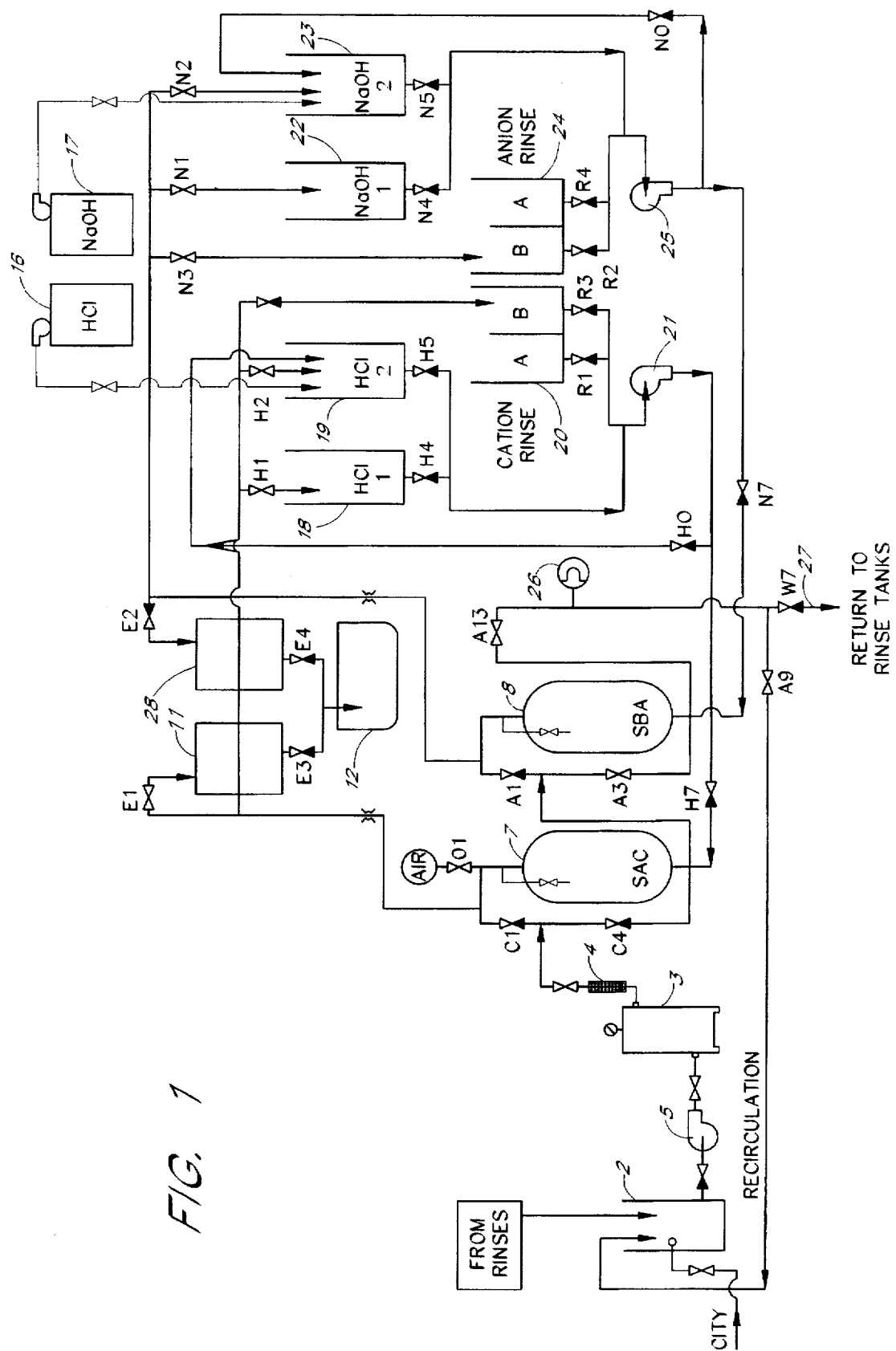
FIG. 1 is a schematic view showing an embodiment of counter-current up-flow regeneration of the present invention, in which a cation exchange bed and an anion exchange bed are placed in series.

There are several ways that reducing waste volume to a certain degree can be conceived. For example, as described above, regenerant solutions can be reduced by partially recycling the chemical draw to the system. However, only ⅓ of the chemical draw can be recycled, if control devices are not used. In addition, counter-current regeneration or regenerant flow opposite to that of service flow results in a lower consumption of chemicals which can mean lower usage (volume). However, a more complex mechanical system is required to compact the bed during the up-flow cycle to improve efficiency. Recycling rinse wastes can reduce overall volume of waste. Usually this is limited to recycling rinse waste only when it is above a certain quality. Minimal backwashes or only periodic backwashes can be employed. However, elimination of the backwash cycle is not feasible; otherwise, dirt and debris in the columns cannot be eliminated, or channeling may occur. All of the above conceivable steps combined may reduce waste volumes by 30–40%. Still, the volume of waste liquid to be handled will average 10 BV or 75 gallons per cubic foot of resin. Surprisingly, by employing the internal cycle system and the programming waste system of the present invention, the volume of waste liquid can be easily reduced to 1 BV (or 7.5 gallons per cubic foot of resin) or less, i.e., approximately ⅒ of the waste volume in the conventional systems.

In the present invention, the regeneration system functionally comprises the steps of backwash, chemical draw, displacement rinse, and quality rinse, although it is not necessary to separately perform these steps.

SYSTEM

The present invention can be adapted to any deionization or demineralization system, which includes rinsing systems for circuit boards, aqueous cleaning, plating/anodizing, and raw water deionization system, regardless of the degree of contamination. The system to which the present invention can be applied typically comprises a collection sump into which industrial rinse flows in a service cycle and into which city water or deionized water flows in a regeneration cycle, a cation exchange column, an anion exchange column, plural caustic tanks (anion regenerant solution tanks) and plural acid tanks (cation regenerant solution tanks) for chemical draw, a displacement rinse tank (plurally sectioned) for displacement rinse, an air purge blower, a feed compartment through which waste is discarded from the system (normally to an evaporator tank), a piping system connecting related equipments, pumps, and flow control systems. There are four main looped channels: The first channel is for a service cycle, i.e., process→collection sump→cation exchange bed →anion exchange bed→process. The second channel is for a cation exchange bed regeneration cycle, i.e., (cation regenerant solution tank or displacement rinse tank) →cation exchange bed→(cation regenerant solution tank or displacement rinse tank). The third channel is for an anion exchange bed regeneration cycle, i.e., (anion regenerant solution tank or displacement rinse tank)→anion exchange bed→(anion regenerant solution tank or displacement rinse tank). The fourth channel is for a quality rinse cycle, i.e., collection sump→cation exchange bed→anion exchange bed→collection sump. In up-flow regeneration (counter-current regeneration when service flow is down-flow), backwash, chemical draw, and displacement rinse cycles can be performed in the second and third channels. In down-flow regeneration (counter-current regeneration when service flow is up-flow), a backwash cycle for the cation exchange bed can be performed in the fourth channel without passing through the anion exchange bed while that for the anion exchange bed can be performed fully in the fourth channel. Chemical draw and displacement rinse cycles in the down-flow regeneration can be performed in the second and third channels. In the second and third channels, in principle, all of the regenerant and the displacement rinse are circulated, and shifted forward by one place in the subsequent cycle, whereby the first segment is removed in the subsequent cycle, and the last segment in the subsequent cycle is provided by fresh solution. Rinse (final rinse) is performed in the fourth channel and flows through the cation exchange bed and the anion exchange bed in series.

In DI ion exchange systems, a cation exchange bed is normally placed upstream of an anion exchange bed. The reason is that the anion resin converts all anions to the hydroxide species and the hydroxide species of most divalent metals (including calcium, copper, tin, lead, etc.) are insoluble. Therefore, if these were introduced to an anion bed, they would precipitate and foul the resin. In some systems, the anion can be used first, for example, if sodium form cation resin is used first to soften the incoming industrial rinse so as to remove the divalent metal therefrom.

In order to constitute a more time-efficient system, the use of a pair of ion exchange columns is advantageous, i.e., placing two beds in parallel. In that system, one ion exchange column, which is exhausted, is subjected to regeneration while the other is in service, so that industrial rinse can be continuously treated by switching columns.

In addition, a chelated metal removal column, an adsorbent column such as a granular activated carbon column and various types of polymeric adsorbents (Rohm & Haas XAD series adsorbents), and a filtration device can be installed upstream of the cation column in this order in order to further minimize the waste volume more efficiently.

As the ion exchange resin, uniform bead size resin is preferably employed in order to more efficiently minimize rinse water volume requirements. Resin beads are normally sized as −16+50 mesh. Uniform beads have uniform regeneration characteristics and thus reduce waste volume, particularly rinses. Beads can be specified by size and uniformly sized beads are available. These resins are typically sized in the −30+45 mesh range. The more uniform the bead, the less rinse and regenerant contact time needed. Therefore, by using a more uniform bead, waste volume can be reduced more. For example, Purolite PFC-100 and PFA-400 can be preferably used.

In the initial part of the regenerant introduction, there is some lifting of the bed for loosening and cleaning. However, as regeneration proceeds, the resins expand and the bed becomes "packed". In the case of a counter-current regeneration, i.e., an up-flow regeneration (service flow is normally down-flow), not much room is required for backwash so that a smaller tank can be used of which there is almost no room at the top, thereby minimizing backwash and regeneration solution. There is only enough room for the resin to fluff up.

Further, one of or any combination of a metal-selective resin column preceding the cation column, a mixed bed type polisher column after the anion column, a weak base anion column preceding the anion column, and a weak acid cation column following the anion column can be installed, depending on the quality of industrial rinses and the target treatment.

The end of the system is an evaporator tank into which the final waste flows. The final waste is concentrated, and subjected to further treatment if necessary. In the present invention, the waste volume is very small, and thus only a very low-volume evaporator tank is required, and concentration is very efficient. Typically, a non-heated atmospheric evaporator can be used.

SERVICE CYCLE

The industrial rinses to be treated are not particularly limited. For example, circuit board rinses and aqueous cleaner rinses having traces of heavy metals, polishers used in metal hydroxide precipitation systems, and raw water to be deionized can be treated.

Flow rate is generally 4 to 8 gpm per $ft^2$ of bed area and 1 to 2 gpm per $ft^3$ of bed volume, although the rate can widely vary depending on the size, the intended use, and the target level of treatment of the system. The system usually runs down-flow during service which is the normal flow direction. However, up-flow can be employed depending on the target industrial rinses, the overall treatments, and other factors.

Pre-filtration in the service cycle reduces but does not eliminate the need for backwashing in a regeneration cycle. That is, pre-filtration is done to reduce the particulate load going to the resin beds which in turn, reduces the needs for backwashing. For pre-filtration, granular activated carbon is suitable. However, a particulate filter such as multi-media or cartridges can also be used. The granular activated carbon also serves to reduce the organic load which is problematic for the anion resin. If pre-filtration is conducted, backwashing is modified to accomplish reclassification only, thereby eventually reducing the waste volume.

REGENERATION CYCLE

After discontinuing the service cycle in the system (if two pairs of cation and anion exchange beds are installed in parallel, one pair of exhausted beds is subjected to regeneration cycle while the other pair of beds is put into service in turn), a regeneration cycle starts. There are two functional approaches to regeneration of deionization systems, one being referred to as counter-current regeneration in which the direction of service flow and that of regeneration flow are opposite, the other being referred to as co-current regeneration in which the direction of service flow and that of regeneration flow are the same. There are also two operational approaches to regeneration of deionization systems, one being referred to as up-flow regeneration in which regeneration is conducted in an up-flow direction, the other being referred to as down-flow regeneration in which regeneration is conducted in a down-flow direction. The up-flow and down-flow regeneration methods can be applied to both up-flow and down-flow service systems, i.e., irrespective of the direction of the service flow. However, counter-current regeneration is normally more efficient than co-current regeneration because the integral of the ion exchange rate from the inlet to the outlet is normally greater in counter-current regeneration than in co-current regeneration. If up-flow regeneration and down-flow regeneration are compared, down-flow regeneration is normally preferred since two liquids having different densities (such as backwash rinse and regenerant) are not merged easily at the boundary, and regenerant can easily flow down by taking advantage of gravity. Thus, the descending order of significance may be: 1) up-flow service cycle and down-flow regeneration (counter-current down-flow regeneration), 2) down-flow service cycle and up-flow regeneration (counter-current up-flow regeneration), 3) down-flow service cycle and down-flow regeneration (co-current down-flow regeneration), and 4) up-flow service cycle and up-flow regeneration (co-current up-flow regeneration). However, in consideration of the fact that down-flow service cycle is much more common than up-flow service, the above 2) may be more important in industry. Although the relative direction of regeneration, counter-current or co-current, is more important than the absolute direction of regeneration, up-flow or down-flow, the operation of regeneration of the present invention will be explained based on the absolute direction, since the operations of counter-current up-flow regeneration and co-current up-flow regeneration are substantially the same, and the operations of counter-current down-flow regeneration and co-current down-flow regeneration are substantially the same.

Regeneration processes typically comprise backwash, chemical draw, displacement rinse, and final rinse. Each process can be independently controlled. For example, backwash is co-current and the other processes are counter-current, chemical draw is counter-current and the other processes are co-current, etc. However, matching the direction of each flow is beneficial. In a typical embodiment, backwash is up-flow, chemical draw and displacement rinse are either up-flow or down-flow, and final rinse is down-flow. The final rinse is usually employed at full flow to purge the residual regenerants from the system and prepare the beds for the next cycle, and thus the final rinse is conducted in a different channel. Part of the channel for the service cycle is usually assigned to the final rinse cycle. Although any combination in terms of the direction of each flow can be employed, two typical embodiments, i.e., up-flow regeneration and down-flow regeneration, will be explained below.

UP-FLOW REGENERATION

In a preferred embodiment of up-flow regeneration, backwash, chemical draw, and displacement rinse are performed in an up-flow direction (final rinse is discussed later). Counter-current up-flow regeneration is generally better than co-current up-flow regeneration in terms of minimization of waste; the former readily achieves over 90% savings, as compared with the latter. Up-flow regenerant is effective since resin "fluffing" which is a very short backwash step is achieved by up-flow regenerant flow. Fluffing lifts the bed so that the resin can readjust itself to alleviate voids and compacted zones. This improves flow distribution, thereby preventing interference of flow. In up-flow regeneration, backwash can be performed simultaneously with chemical draw, i.e., backwash and chemical draw can be combined, and both are performed by a single cycle. By using a filtration device upstream of ion exchange beds during a service cycle, it is possible to minimize the necessity of a lengthy backwash. In that case, the main function of backwash is a "fluffing" of the ion exchange beds.

One approach to minimization of waste is air purge prior to regeneration to reduce the effects of dilution on total waste volume. Hitherto, in a DI system, backwash simply started upon discontinuance of service cycle, meaning that full of untreated water which remained in the beds was expelled by backwash water which was usually raw water, and discarded along with the backwash water. With this system, water purged out with the air is pushed back into a collection sump which will be processed later. By conducting the air purge, it becomes easy to separate the two, i.e., water to be reused and regenerant to be discarded, thereby reducing the waste volume.

1. FIRST PORTION OF REGENERATION

In this embodiment, backwash and chemical draw are combined. After emptying an ion exchange bed, a first portion of regenerant (dilute chemical) is introduced to the bed from the bottom at a rate such that the bed is reclassified and regenerated simultaneously. In other words, backwash is performed with regenerant. Through reclassification of the bed by fluffing up the resin, mass transfer zones which are developed by service flow are redistributed, thereby regaining the full column capacity of the resin. Although the flow rate of the regenerant for backwash and regeneration varies according to the bed density, flows for cation exchangers and for anion exchangers are typically 1.5 to 2.5 gpm per $ft^2$ and 0.5 to 1.5 gpm per $ft^2$ of bed area, respectively. For a typical three foot bed depth, this amounts to 0.33 to 0.66 $gpm/ft^3$. When a resin bed is backwashed, the smaller beads go to the top and the coarser ones to the bottom. By having all of the beads of one size close together, the pressure drop across the bed is minimized and distribution is improved. Regeneration is more efficient when the bed is compacted so that the resin does not move around during the chemical injection step. In order to compact the bed during up-flow regeneration, either a mechanical or hydraulic device must compact the bed by pushing in the opposite direction. In the case of a "packed" bed, the media is "locked in" by filling the bed almost completely. As the resin expands during regeneration, it fills the balance, thus compacting it and eliminating resin mobility assuring regenerant utility. In this regard, interrupted flow (pulse flow) is advantageous, especially when up-flow regeneration, hitherto requiring mechanical means to secure the beds, is employed, since pulse flow tends not to move the ion exchange resin. In this way, complicated mechanical means to secure the beds can be eliminated. In addition, by employing pulse flow, the amount of regenerant can be reduced, meaning that the waste volume finally generated in the system will be significantly reduced. Pulse flows for cation exchangers and for anion exchangers are typically 1.5 to 2.5 gpm per $ft^3$ and 0.5 to 1.5 gpm per $ft^3$ of bed area, respectively at an interval of 30–60 seconds.

In the present invention, the above first portion of regenerant which is used in backwash and regeneration is the second portion of regenerant in the previous cycle, as described later. The first portion of regenerant is rich in chemicals and discarded from the system. In a preferred embodiment, only the first portion of the regenerant in the system will be discarded, which is usually one BV.

2. REMAINING PORTIONS OF REGENERATANT AND PORTIONS OF DISPLACEMENT RINSE

After the first portion of regenerant is introduced, the second portion of regenerant is introduced to the bed from the bottom. After the second portion of regenerant is spent, it is saved to be used as the first portion of regenerant in the subsequent chemical draw cycle. If regenerant is composed of two portions, i.e., the first half and the second half, the second half of regenerant is saved to be used as the first half of the next chemical draw. The second half of regenerant is the first portion of displacement rinse used in the previous displacement cycle, meaning that the first portion of displacement rinse described below is saved to be used to make up regenerant chemicals for chemical draw. In brief, one cycle can run as follows:

(a) preparing plural portions of regenerant in sequence, said portions being numbered from 1 to n (where n is an integer >1, usually $2 \leq n \leq 4$, typically n=2, if n is increased, the system becomes complex and efficiency is lessened);

(b) backwashing and regenerating an ion exchange bed with the first portion of regenerant by introducing said portion to said ion exchange bed in an up-flow direction at a rate sufficient to reclassify said resin accommodated in said bed and to regenerate said resin;

(c) further regenerating said ion exchange bed by introducing in sequence each portion of cation regenerant solution thereto in an up-flow direction, whereby the effluent of the first portion of cation regenerant solution is expelled from the cation exchange bed and separated from the regeneration cycle, e.g., discarded to a feed compartment for evaporation;

(d) saving the effluent of each portion, except the first portion, of cation regenerant solution to be used as a portion of cation regenerant solution in the subsequent cycle in such a way that the effluent of portion #m ($2 \leq m \leq n$) is saved to be used as portion #(m−1) in the subsequent cycle;

(e) preparing displacement rinse, preferably plural portions of displacement rinse, said portions being numbered from 1 to q (where q is an integer >1, usually $2 \leq q \leq 4$, typically q=3, if q is increased, the system becomes complex and efficiency is lessened), in which portion number q is provided by fresh rinse;

(f) displacing the regenerant present in said ion exchange bed with said displacement rinse preferably by introducing each portion in sequence to said ion exchange bed in an up-flow direction;

(g) saving part of the effluent of displacement rinse, preferably the first portion of displacement rinse to be used as the last portion of regenerant (#n) in the subsequent cycle, the concentration of said last portion of regenerant being adjusted (said first portion is rich in chemicals, and used to makeup regenerant chemicals for the next chemical draw);

(h) preferably saving the effluent of each of the remaining portions of displacement rinse to be used as a portion of displacement rinse in the subsequent cycle in such a way that the effluent of portion #p ($2 \leq p \leq q$) is saved to be used as portion #(p−1) in the subsequent cycle;

(i) performing steps corresponding to steps (a) to (h) on said other ion exchange bed. If a cation exchange bed and an anion exchange bed are treated simultaneously, treatment time can be significantly reduced.

In the above, one portion is usually equivalent to one BV. By employing the above rotation, the waste volume will be markedly reduced, i.e., preferably a total of one BV. In conventional systems, recirculating displacement rinses was not adopted, since the dirtier the water, the more capacity is used up and the less the cleaning effect on the resin. The circulation system of the present invention solves the above problem.

Chemical draw is typically carried out at concentrations of 4–6% or approximately 0.50 lbs (active) per gallon in the conventional processes. In the present invention, concentration of regenerants is increased, for example, to 6–8%. This concentration is kept at precise levels with the help of concentration monitors and a chemical injection pump which adds the proper regenerant chemicals. The concentration of chemical in each column, therefore is consistent for proper regeneration. Typical ion exchange system utilize regenerant chemicals at 4–5%. An increased concentration helps minimize waste water volume. Although approximately 6% typifies the concentration in the present invention, properly controlled, regenerant concentrations can be pushed all the way up to 15 to 20%. However, the higher the concentration, the lower the volume of regenerant. There are certain minimum contact times needed for adequate regeneration. If the volume is too small, even at a higher concentration, the contact time is too short and poor regeneration results. Systems that use very high concentrations also use very high volumes and produce a lot of water. Normal practical limits may be a low of 2% and a high of 12.5%. For example, as the chemicals for chemical draw, $HCl$, $H_2SO_4$, $NaOH$, and $NaCl$ can be used. Regeneration is typically carried out at flow rates of 0.25 to 1.0 gpm per $ft^3$.

As the final displacement rinse, tap water is used. However, since there are some basic incompatibilities with raw water and NaOH, decationized water would be used to regenerate the anion.

Interrupted flow (pulse flow) is also advantageous in the displacement cycle as it is advantageous in backwash and chemical draw, especially when up-flow regeneration is employed.

DOWN-FLOW REGENERATION

The aforesaid method can be adapted to down-flow regeneration. In down-flow regeneration, chemical draw and displacement rinse are performed in an ion exchange bed in a down-flow direction. Backwash can be separately conducted in an up-flow direction using a different channel, and recycled in a loop. The loop of backwash for the cation exchange bed is as follows: collection sump→cation exchange bed→collection sump. The loop of backwash for the anion exchange bed is as follows: collection sump→cation exchange bed→anion exchange bed→collection sump, so that divalent cation can be removed. This backwash can be conducted based on conventional backwash, i.e., the flow rate is typically 6 gpm per $ft^3$ for cation exchange beds, 2 $gpm/ft^3$ for anion exchange beds. After backwash, the remaining water in the beds is expelled by the first effluent from the chemical draw cycle and brought back to a collection sump.

Chemical draw and displacement rinse can be performed in a similar way to that in up-flow regeneration. Regenerant and displacement rinse are introduced to a bed from an upper part of the bed, e.g., just above the resin accommodated in the bed, because there is a large free space above the resin in the bed, which is filled with untreated water. Regenerant introduced just above the resin can automatically move downward. In brief, similar to up-flow regeneration, down-flow regeneration can be conducted as follows:

(a) backwashing cation and anion exchange beds by circulating backwash rinse through said cation and anion exchange beds in an up-flow direction, and recirculating said backwash rinse;

(b) preparing plural portions of regenerant in sequence, said portions being numbered from 1 to n (where n is an integer >1, usually 2≦n≦4, typically n=2, if n is increased, the system becomes complex and efficiency is lessened), whereby the backwash rinse present in said cation and anion exchange beds are expelled therefrom, and separated from the regeneration cycle, e.g., moving it to a collection sump for the subsequent process;

(c) regenerating said ion exchange bed with the first portion of regenerant by introducing said portion to said ion exchange bed from an upper part of the resin accommodated therein in a down-flow direction;

(d) further regenerating said ion exchange bed by introducing in sequence each portion of cation regenerant solution thereto in a down-flow direction;

(e) saving the effluent of each portion, except the first portion, of regenerant to be used as a portion of regenerant in the subsequent cycle in such a way that the effluent of portion #m (2≦m≦n) is saved to be used as portion #(m−1) in the subsequent cycle;

(f) preparing displacement rinse, preferably plural portions of displacement rinse, said portions being numbered from 1 to q (where q is an integer >1, usually 2≦q≦3, typically q=3, if q is increased, the system becomes complex and efficiency is lessened), in which portion #q is provided by fresh rinse;

(g) displacing the cation regenerant solution present in said ion exchange bed with said displacement rinse preferably by introducing each portion in sequence to said ion exchange bed from an upper part of the resin accommodated therein in a down-flow direction;

(h) saving part of the effluent of displacement rinse, preferably the effluent of the first portion of displacement rinse to be used as the last portion of regenerant in the subsequent cycle, the concentration of said last portion of cation regenerant solution being adjusted (said first portion is rich in chemicals, and used to make up regenerant chemicals for the next chemical draw);

(i) preferably saving the effluent of each of the remaining portions of displacement rinse to be used as a portion of displacement rinse in the subsequent cycle in such a way that portion #p (2≦p≦q) is saved to be used as portion #(p−1) in the subsequent cycle;

(j) performing steps corresponding to steps (b) to (i) on the other ion exchange bed. If a cation exchange bed and an anion exchange bed are treated simultaneously, treatment time can be significantly reduced.

FINAL RINSE

In both, up-flow regeneration and down-flow regeneration, after the above-described displacement rinse, the ion exchange beds are subjected to final rinse or quality rinse to purge the residual regenerants from the system and prepare the bed for the next cycle. This is also referred to as rapid rinse and can average 10–30 minutes for each resin at 2–3 gpm/ft³. Final rinse can be performed in cation and anion exchange beds in series as follows:

(A) circulating the final rinse through the cation exchange bed and the anion exchange bed in series in a down-flow direction; and (B) recirculating said final rinse until the quality of rinse discharged from either cation or anion exchange bed reaches a predetermined level. Part of the channel for the service cycle can be assigned to the final rinse. This rinse is an internal rinse, all of which is recirculated.

Excess chemicals left after displacement are rinsed out and picked up by the opposition resin, resulting in using up the capacity of the resin. However, the benefit of minimized water volume outweighs the above minor drawbacks. That is, there is some loss of capacity due to the fact that the rinse waters are recirculated. Excess acid in the cation rinse becomes an exhaustant for the anion. Excess caustic becomes an exhaustant for the cation. If the capacity of the resin is roughly equal to 2 lbs of regenerant, and there is 2% regenerant left in the resin after the displacement rinses (equal to 0.16 lbs), then 8 to 10% of the total capacity will be lost while reducing the rinse volume by 30–40 gallons (4–6 BV). This is not a significant loss as compared with the great benefit of reduction of the total waste volume. Deionized water readily picks up caustic acid and efficiently neutralizes rinse discharged from ion exchange beds. When the conductivity of the rinse is below a predetermined level, regeneration is complete, and the service cycle is resumed.

COMBINATION OF THE PROCESSES

Each of the features contributes some level of waste water reduction. The primary savings comes from the recycled backwashes and the internal rinses. Cation resins use a lot of water for backwashing compared to anions. However, anions use more for rinsing. Approximately 70% of the waste volume can be reduced by employing the recirculated rinse, while approximately 25–75% of the waste volume can be reduced by partially reusing regenerant. When some of the processes are combined, reduction become more significant due to synergistic effects. In down-flow regeneration, by employing the recycled backwash, the progressive displacement cycle of chemical draw and displacement rinse, and the recirculated final rinse, it is possible to achieve approximately 85–90% reduction of the waste volume. In up-flow regeneration, by employing the packed beds, the chemical draw combined with backwash, the progressive displacement cycle of chemical draw and displacement rinse, and the recirculated final rinses, it is possible to achieve approximately 88–93% reduction of the waste volume. The overall reduction in terms of descending order of significance can be rated as follows:

1. Recycled backwash or backwash-combined chemical draw
2. Recirculated final rinse
3. Air purging
4. Reuse of regenerant or progressive displacement cycle of chemical draw and displacement rinse
5. Uniform beads
6. Pre-filtration
7. Packed beds
8. Counter-current regeneration
9. Progressive displacement rinses
10. Increased regenerant concentration

OTHER PROCESSES

A metal-selective resin column, a mixed-bed type polisher column, a weak base anion column, a weak acid cation column, and others can be used in a system, depending on what is in the stream, what should be taken out, and what quality is required at the end. If the system contains chelated copper, nickel or zinc, it is generally necessary to use a selective resin to break this chelate. Other forms of complex metals do not require it. If the metal-selective resins are used to do some of the "roughing", the deionized system may not have to work as hard. A granular activated carbon bed is normally equipped for removal of organics.

If ultra-high purity water is needed, a mixed-bed is generally used. Mixed-beds are preferably avoided because they are difficult to regenerate and use a lot of water. Instead, a weak acid cation polisher can be used to pick up any cations that leak through.

Weak acid cation polishers can be used to remove traces of sodium that may leak from conventional cation systems. Sodium can be "bumped" off the cation by heavy metals which are more selectively held. In this case the polisher picks up mainly sodium. However, if the cation loading is excessive, the polisher may simply serve as reserve capacity.

Weak base resins may be used with cation only or in front of strong base anion columns.

EMBODIMENT 1

COUNTER-CURRENT UP-FLOW REGENERATION SYSTEM

FIG. 1 is a schematic piping system showing an example of a basic deionizing and regenerating system adapted to the present invention, in which counter-current up-flow regeneration is adopted. Although a carbon column is preferably installed upstream of a cation exchange bed, it is omitted in this system.

Service Cycle

Rinse water used in a process such as a plating system is deionized in a deionizing system, recycled, and reused in the process. Deionizing flow is herein called service flow. The rinse water used in the process goes into a rinse tank 1 and pours into a collection sump 2. This is the inlet of the system. The outlet of the system is a service outlet, from which the deionized rinse water is discharged and returns to the process. The rinse water to be deionized goes through a pump 5 and a filter 3, and enters a strong acid cation exchange bed 7 from the top via a valve C1. The flow rate is monitored by a flow meter 4. The cation exchange rinse water is discharged from the bottom of the strong acid cation exchange bed 7, and enters a strong base anion exchange bed 8 from the top via a valve A1. The anion-exchanged rinse water is discharged from the bottom of the strong base anion exchange bed 8, and returns to the process via the service outlet 27 through valves A13 and W7.

Preliminary Treatment

After the pump 5 is turned off and the service cycle is discontinued, a regeneration cycle is initiated. The first step of the regeneration cycle is air purge. An air pump 10 is turned on, and a valve O1 is opened. Air is introduced into the cation exchange bed 7 and then into the anion exchange bed through a valve A1, and expels the remaining rinse water of the service cycle out of the exchange beds 7 and 8 via the valve A13 and a valve A9, whereby the rinse water goes back to a collection sump 2. All the rinse water in the beds is pulled out prior to regeneration treatment, thereby eliminating dilution of chemicals to be subsequently used as regenerant.

Cation Exchange Bed Regeneration Cycle

The next step of the regeneration cycle is a chemical draw cycle which also functions as backwash. Valves H4, H7, and E1 are opened and a pump 21 is activated, so that the first half of the acid solution (HCl), stored in a first acid tank 18, is fed into the strong acid cation exchange bed 7 from the bottom. The acid solution is part of the previously used acid solution (the second half of the acid solution) as explained later. The speed of the flow is sufficiently slow to regenerate the resin with H⁺, but fast enough to lift the resin and reclassify it and to pick up any dirt if present. At this end, this flow functions as backwash with acid solution. When the water level of the acid solution in the first acid tank 18 is low and reaches a predetermined level, a valve H5 is opened and a valve H4 is closed. The second half of the acid solution starts flowing and entering the cation exchange bed 7 via the pump 21 and the valve H7. As an additional aspect, the acid solution can be circulated via a valve HO, the tank 19, and the pump 21. Since the acid solution is the first solution, the acid solution picks up a significant portion of the metals from the resin, and thus the acid solution is fed into the feed compartment 11 via a valve E1 and then goes to an evaporator-holding tank 12 via a valve E3. The above flow is conducted as the second half of the acid solution enters the cation exchange bed 7 and expels the remaining first half of the acid solution therefrom. This waste volume accommodated in the feed compartment 11 is controlled by a level switch provided in the feed compartment 11, as described below, so that the volume can be approximately equivalent to one bed volume, i.e., the volume of the first half of the acid solution.

The acid concentration of the solution in the second acid tank 19 is adjusted by introducing acid concentrate to the second acid tank 19 (the adjusted concentration is approximately 8%). When the water level of the acid solution in the second acid tank 19 is low and reaches a predetermined level, the valve H5 is closed, and a valve R3 is opened, and then the cycle proceeds to a displacement rinse cycle.

At a predetermined low level in the "B" compartment of a displacement rinse tank 20 (cation rinse tank), a valve R3 is closed and a valve R1 is opened. The acid solution in the system, i.e., in the bed 7 and the piping, is continuously expelled and transferred to an evaporator feed tank 11. When the level of the spent acid solution reaches a predetermined level in the evaporator feed tank 11, the valve E1 is closed, and the flow diverts to the first acid tank 18 with a valve H1 open. The acid solution in the first acid tank 18 will be used in the next cycle, i.e., the second half of the acid solution is saved to be used, without enriching chemicals, as the first half of the next acid solution, since the second half of the acid solution is still rich in acid. At a predetermined high level in the first acid tank 18, the valve H1 is closed and the valve H2 is opened, thereby diverting the flow to the second acid tank 19. At a predetermined high level in the tank 19, the valve H2 is closed and valve H3 is opened with flow going to the displacement rinse tank 20.

Displacement Rinse Cycle

When the level of the second ⅓ of the displacement rinse accommodated in the section B is low and reaches a predetermined level, raw water is provided from the collection sump 2 to the bed 7 as the third ⅓ of the displacement rinse via the valve C3, thereby expelling the second ⅓ of the displacement rinse remaining in the system and moving it to the section B of the displacement rinse tank 20. The used second ⅓ of the displacement rinse in the section B overflows to the section A, and is saved to be used as the first ⅓ of the displacement rinse in the subsequent displacement cycle. After being used, the third ⅓ of the displacement rinse (raw water) is fed into the section B of the displacement rinse tank 20, and when reaching a predetermined level in the section A, the valve H3 is closed. In this way, the third ⅓ of the displacement rinse is saved to be used as the second ⅓ of the displacement rinse in the subsequent displacement cycle.

In brief, the first half of the acid solution, the second half of the acid solution, the first ⅓ of the displacement rinse, the second ⅓ of the displacement rinse, and the third ⅓ of the displacement rinse are each shifted by one place ahead in the subsequent cycle. That is, the first half of the acid solution is to be discarded; the second half of the acid solution is saved to be used as the subsequent first half of the acid solution; the first ⅓ of the displacement rinse is saved to be used as the subsequent second half of the subsequent acid solution; the second ⅓ of the displacement rinse is saved to be used as the subsequent first ⅓ of the displacement rinse; the third ⅓ of the displacement rinse is saved to be used as the subsequent second ⅓ of the displacement rinse; and raw water serves as the third ⅓ of the displacement rinse. This system is called "progressive displacement". As a result, only the first half of the acid solution, i.e., one bed volume, is discarded from the system.

The above regeneration of a cation exchange bed is preferably conducted simultaneously with that of an anion exchange bed, thereby increasing the efficiency.

Anion Exchange Bed Regeneration Cycle

The regeneration of the anion exchange bed can be performed in the same way as that of the cation exchange bed. That is, a valve N4 is opened, a pump 25 is turned on, valves N7 and E2 are opened. Alkaline solution (NaOH) flows from a tank 22 into the anion exchange bed 8, and pushes the air in the anion exchange bed out from the top. When the level of alkaline solution in the tank 22 is low and reaches a predetermined level, a valve N4 is closed and a valve N5 is opened, and alkaline solution in a tank 23 starts flowing via the valve N5. The second half of the alkaline solution starts flowing and entering the anion exchange bed 8 via the pump 25 and the valve N7. As an additional aspect, the alkaline solution can be circulated via a valve NO, the tank 23, and the pump 25. The bed 8 is filled up with alkaline solution, and then the first bed volume in the bed 8 is discarded to a feed compartment 28 via a valve E2 as follows: At a predetermined low level in tank 23, the valve N5 is closed and the valve R2 is opened, displacement rinse starts flowing into the bed 8, and pushes the alkaline solution present in the bed 8 out of the system. This solution expelled from the system corresponds to the first portion of alkaline solution. At a predetermined high level in the evaporator feed tank 28, a valve E2 is closed and a valve N1 is opened, thereby diverting the alkaline solution flow to the tank 22 (the solution accommodated in the feed tank 28 will go to the evaporator-holding tank 12 via a valve E4). At a predetermined high level in the tank 22, the valve N1 is closed and the valve N2 is opened, and the weak alkaline solution/rinse solution is saved to the tank 23. At a predetermined high level in tank 23, valve N2 is closed and the flow goes to the tank 24. The third portion of displacement rinse is provide by raw water which is fed into the bed 7 and into tank 8, and pushes the remaining second portion of displacement rinse to a displacement rinse tank 24 via a valve N3 to be used as the first portion of displacement rinse in the subsequent cycle. The third portion of displacement rinse is saved to be used as the second portion of displacement rinse in the subsequent cycle.

Quality Rinse (Final Rinse) Cycle

After displacement rinse, the pumps 21 and 25 are shut off. A small amount of acid solution and alkaline solution still remain in the beds 7 and 8 respectively, and thus quality rinse is performed at full flow to purge the residual regenerants from the system and prepare the beds for the next cycle. The pump 5 is activated, and water for quality rinse from the collection sump 2 is permitted to flow through the filter 3, the flow meter 4, the valve C1, the cation exchange bed 7, the valve A1, the anion exchange bed 8, and the valves A13 and A9 in series via the service flow path (down-flow regeneration), and the quality rinse is recirculated until the electric conductivity of the rinse discharged from the anion exchange bed 8 is sufficiently low to initiate service flow. The conductivity of the rinse can be measured by a conductivity monitor 26.

When the conductivity of the rinse discharged from the bed 8 reaches a predetermined level, regeneration is completed, and the system is back in service. In the above quality rinse cycle, no wastewater is produced. All of the rinse is recirculated in the system.

EMBODIMENT 2

Counter-Current Down-Flow Regeneration System

Figure 2:
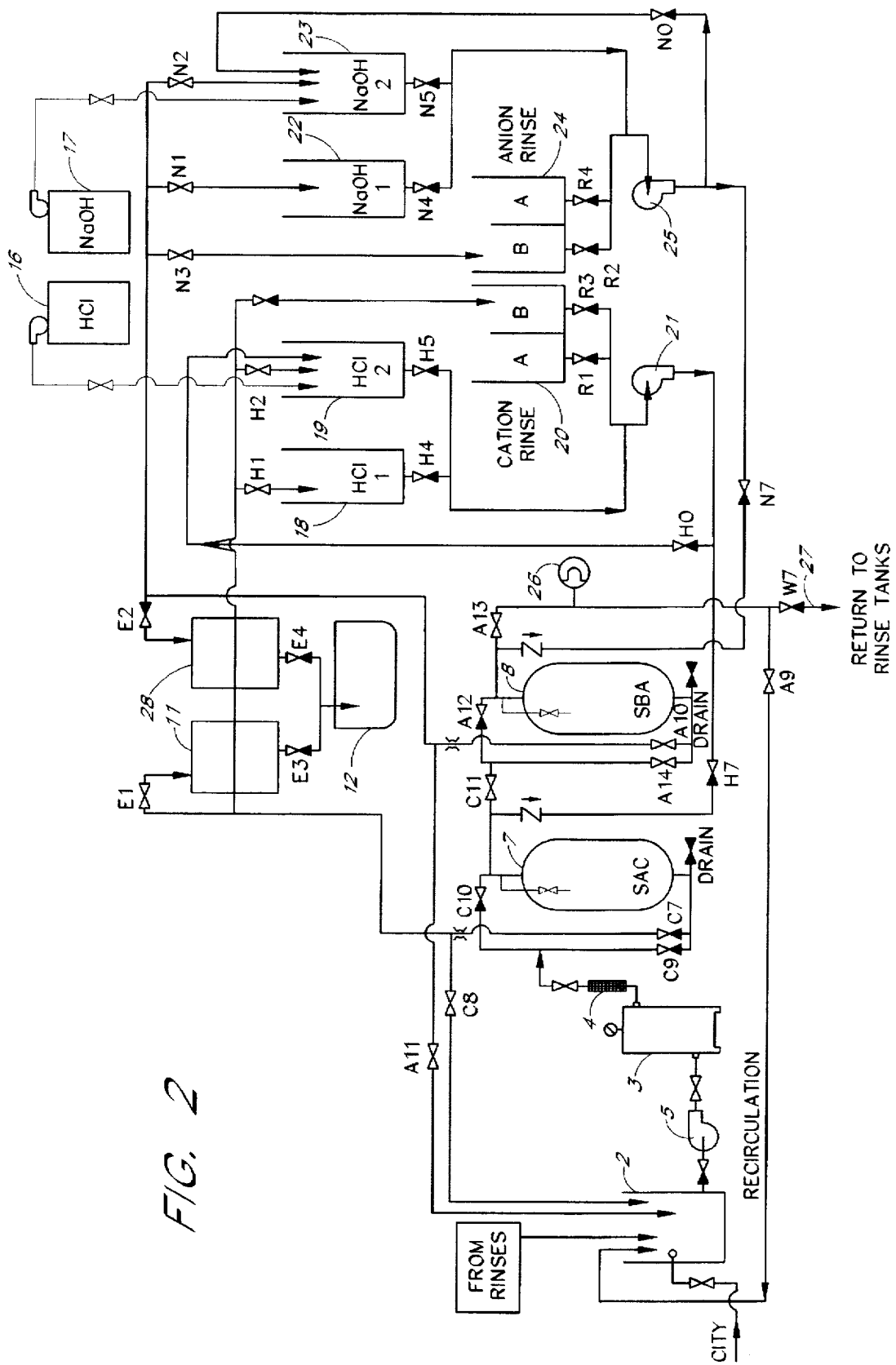
FIG. 2 is a schematic view showing an embodiment of counter-current down-flow regeneration of the present invention, in which a cation exchange bed and an anion exchange bed are placed in series.

FIG. 2 is a schematic piping system showing an example of a basic deionizing and regenerating system adapted to the present invention, in which counter-current down-flow regeneration is adopted. A regeneration cycle is basically the same as that of up-flow regeneration described earlier, and thus detailed explanation will be omitted. However, service flow is conducted in an up-flow direction which is opposite to the direction in up-flow regeneration shown in FIG. 1. Further, valves A11 and C8 are installed to expel the existing water (backwash rinse) from the beds 7 and 8 to the collection sump 2 prior to regeneration.

Service flow is performed in an up-flow direction via the collection sump 2, the pump 5, the filter 3, the flow meter 4, a valve C9, the cation exchange bed 7, valves C11 and A14, the anion exchange bed 8, valves A13 and W7, and the service outlet 27.

Backwash for the cation and anion exchange beds 7 and 8 is performed in an up-flow direction in a loop via the pump 5, the filter 3, the flow meter 4, the valve C9, the cation exchange bed 7, the valves C11 and A14, the anion exchange bed 8, the valves A13 and A9, and the collection sump 2, when the valves C10, C7, A12, A10, and W7 are closed, wherein divalent cation is removed prior to entering the anion exchange bed. The progressive displacement cycle of chemical draw (cation) and displacement rinse is performed in a down-flow direction in a loop via the pump 21, the valve H7, the cation exchange bed 7, a valve C7, and the tanks 18/19/20. The progressive displacement cycle of chemical draw (anion) and displacement rinse is performed in a down-flow direction in a loop via the pump 25, the valve N7, the anion exchange bed 8, a valve A10, and the tanks 22/23/24. Since air-purging is not conducted in the down-flow regeneration, before the above regeneration cycles start in the loops, the first volume from each of the beds 7 and 8, which is backwash rinse remaining in each of the beds 7 and 8, is diverted to the collection sump 2 via the valves C8 and A11. The timing of opening and closing the valves C8 and A11 can be calculated, and controlled by a PLC. Final rinse is performed in a down-flow direction in a loop via the pump 5, the filter 3, the flow meter 4, the valve C9, the cation exchange bed 7, the valves C11 and A14, the anion exchange bed 8, the valves A13 and A9, and the collection sump 2. The conductivity of the final rinse downstream of the anion exchange bed 8 is measured by the conductivity monitor 26.

EMBODIMENT 3

Counter-Current Up-Flow Regeneration Dual-Line System

Figure 3:
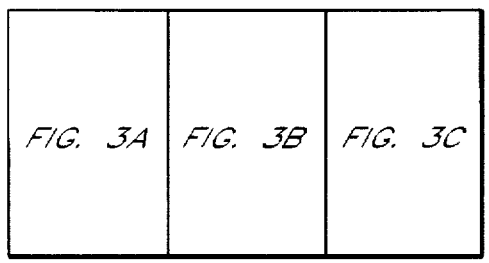
FIG. 3 is a schematic view showing an embodiment of counter-current up-flow regeneration of the present invention, in which a granular activated carbon bed, a pair of strong acid cation exchange beds, a pair of strong base anion exchange beds, and a pair of weak acid cation exchange beds are placed in series, wherein each one of the paired beds is in service and the other one is in regeneration process.
Figure 3A:
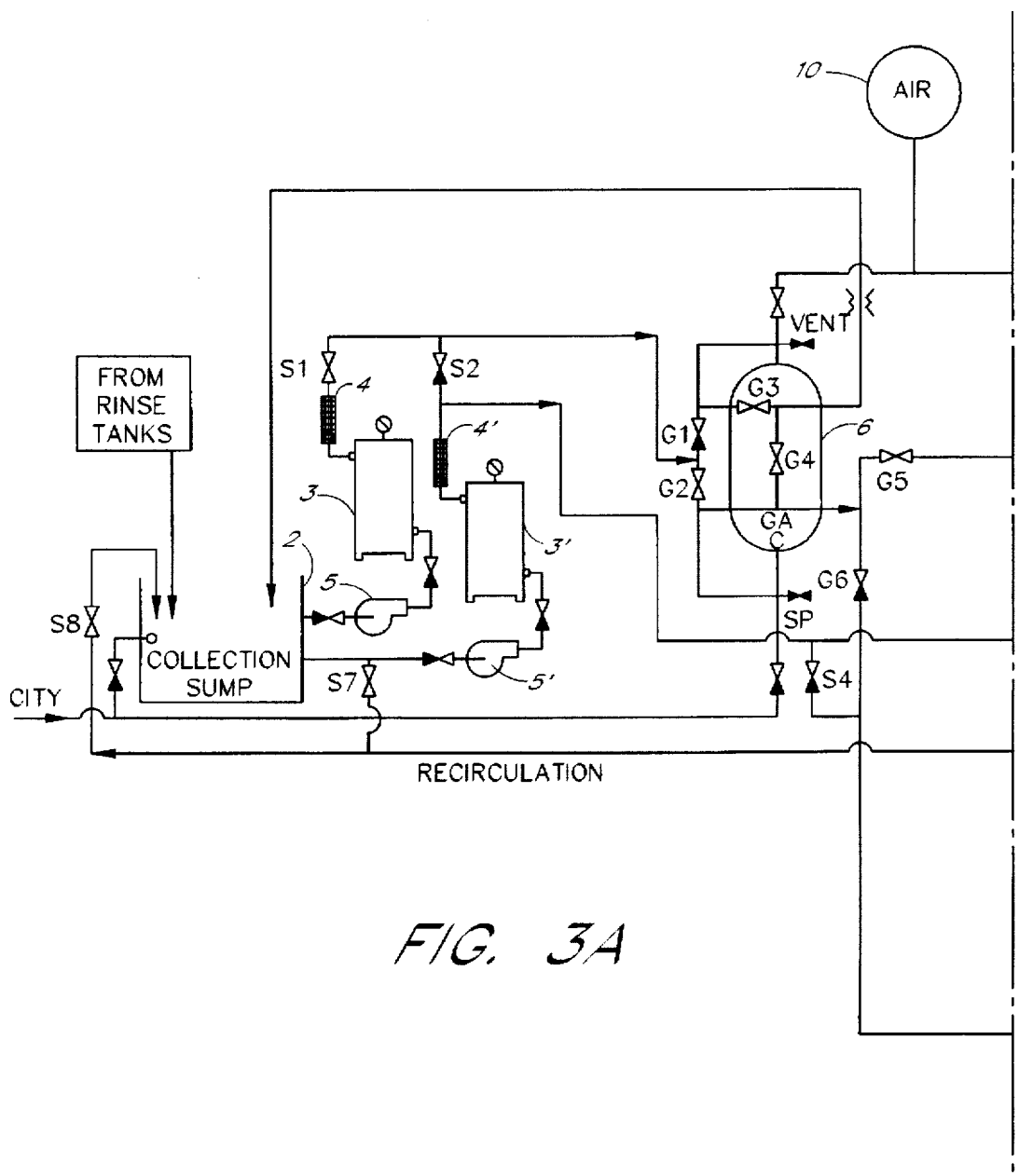
Figure 3B:
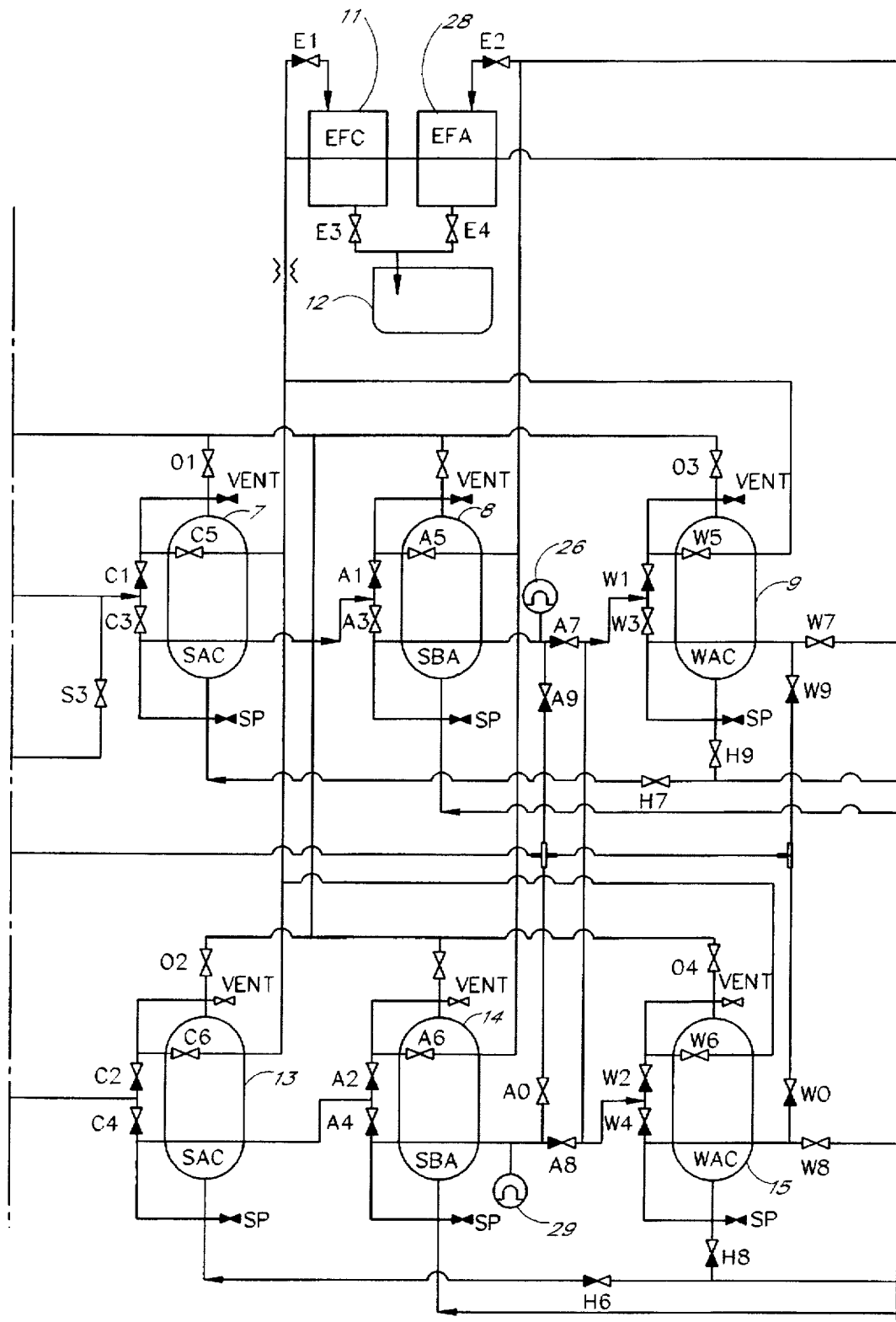
Figure 3C:
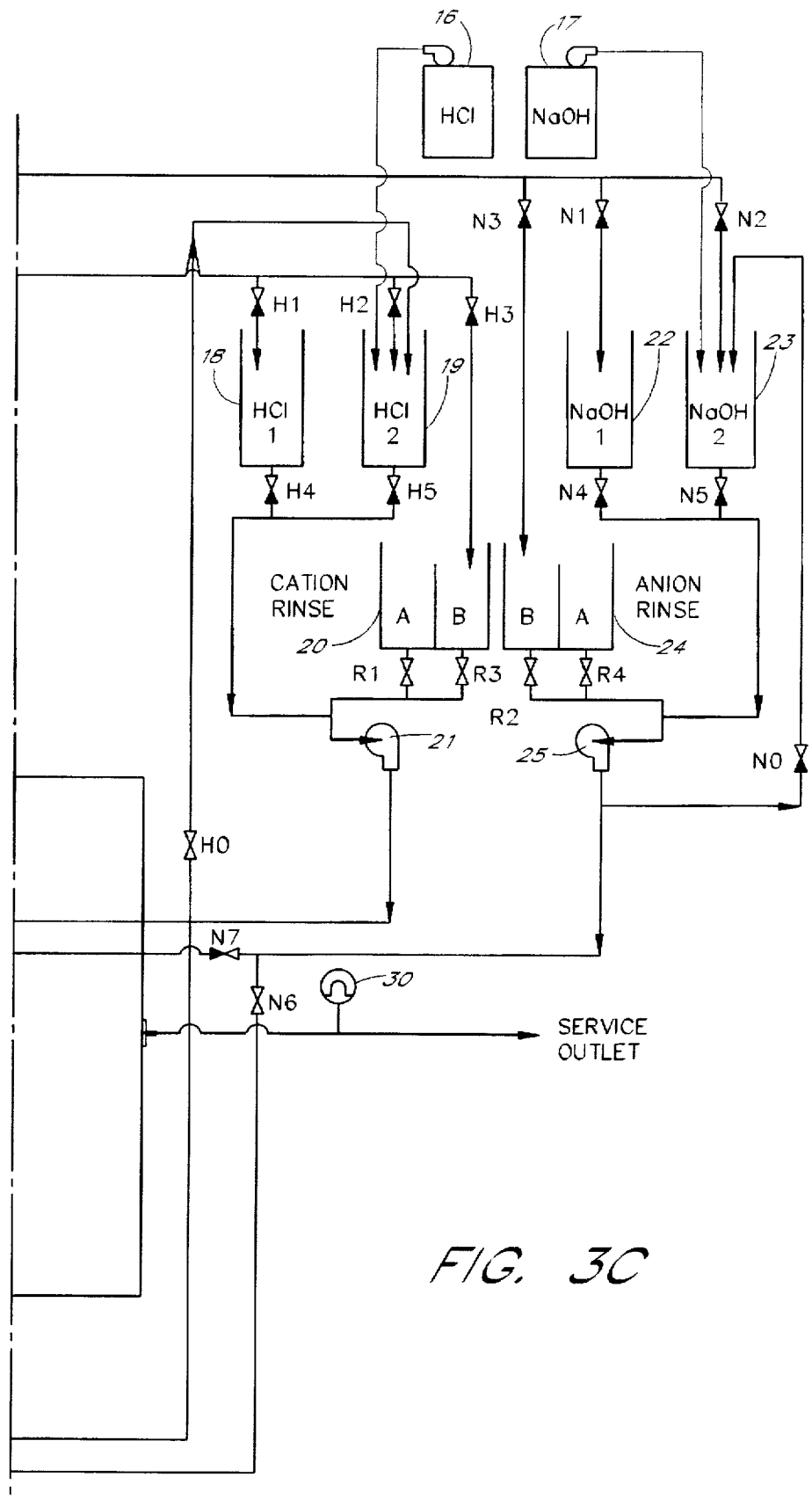

FIG. 3 is a schematic piping system showing an example of a deionizing and regenerating system adapted to the present invention, in which counter-current up-flow regeneration is adopted. A regeneration cycle is basically the same as that of up-flow regeneration described earlier (FIG. 1), and thus detailed explanation will be omitted. In this embodiment, the system comprises two strong acid cation exchange beds 7 and 13, two strong base anion exchange beds 8 and 14, two weak acid cation exchange beds 9 and 15, and a granular activated carbon bed 6. Two pairs of strong acid cation and strong base anion exchange beds are employed so that when one pair of them is exhausted, the other one is put into service, and the exhausted pair is subjected to a regeneration cycle. When the exhausted pair is regenerated, and the in-service pair is exhausted, the former pair is put into in service, and the latter pair is subjected to a regeneration cycle. For example, when the strong acid cation exchange bed 7 and the strong base anion exchange bed 8 are exhausted, a valve G5 is closed, and a valve G6 is opened. Water to be treated in service flows via a valve C2, a strong acid cation exchange bed 13, a valve A2, a strong base anion exchange bed 14, valves A8 and W1, a weak acid cation exchange bed 9, and the valve W7. The operation of the weak acid cation exchanges bed 9 and 15 can be conducted independently of the operation of a pair of the beds 7 and 8, or the other pair of the beds 13 and 14. That is, a combination of the beds 7, 8, and 9; the beds 7, 8, and 15; the beds 13, 14, and 9; or the beds 13, 14, and 15 can be employed for service and regeneration. In this way, deionization treatment can be continuously conducted. This system with the weak anion exchange bed is suitable for treating rinse used in plating and other processes in which high resistivity is desired and a high pH cannot be tolerated. A regeneration cycle can be performed in the same way as that in Embodiment 1 (FIG. 1). Final rinse is conducted via the strong acid cation exchange bed 7 and the strong base anion exchange bed 8, or the strong acid cation exchange bed 13 and the strong base anion exchange bed 14, and the weak acid cation exchange bed 9 or 15 in series.

EXAMPLE

Using the system shown in FIG. 3, the rinse used in plating was deionized. 5 ft$^3$ of "PFC-100-H" (product name, Purolite Co., Philadelphia) was used as the strong acid cation resin. 5 ft$^3$ of PFA-400-OH (product name, Purolite Co., Philadelphia) was used as the strong base anion resin. 5 ft$^3$ of C-105-H (product name, Purolite Co., Philadelphia) was used as the weak acid cation resin. 6 ft$^3$ of 8×3 coal based acid washed (ATOCHEM, Oklahoma) was used as the granular activated carbon. Ametek™ 4"×20"-spun bonded polypropylene (AMETEK, Connecticut) was used as the filter. Rinse to be deionized had a conductivity of 1,700 $\mu$S.cm$^-$. Service flow was conducted via the pump 5, the filter 4, the flow meter 3, a valve G1, the carbon bed 7, a valve G5, the valve C1, the bed 7, the valve A1, the bed 8, the valve A7, a valve W1, the bed 9, and a valve W7. After 10 hours of operation with the strong acid cation exchange bed 7, the strong base anion exchange bed 8, and the weak acid cation exchange bed 9, the conductivity of deionized water discharged from the strong base anion exchange bed 8 became high (10 $\mu$S.cm$^-$ measured by a conductivity monitor 26), meaning that the beds 7 and 8 had been exhausted. Thus, the route of the service flow was changed so as to pass through the strong acid cation exchange bed 13, the strong base anion exchange bed 14, and the weak acid cation exchange bed 9, not through the beds 7 and 8 which were then subjected to a regeneration cycle. Switching the service line via the beds 7 and 8 to the service line via the beds 13 and 14 was conducted by closing the valves G5 and A7, and opening the valves G6 and A8, so that process water started flowing through the beds 13 and 14 instead of the beds 7 and 8. Based on the piping in FIG. 3, service flow and regeneration flow can be conducted simultaneously, without any obstacle. Regeneration of the beds 7 and 8 was conducted as follows:

First, the air purge blower 10 was turned on and air was introduced into the strong acid cation exchange bed 7 via the valve 01, thereby the remaining water in the system was expelled and returned to the collection sump 2 via the valves A1, A9, and S8. The pressure of the air was 60 psig. A progressive displacement cycle was then started. In each of the first acid tank 18 and the second acid tank 19, 37.5 gallons of 8% HCl solution was accommodated. In each of the compartments A and B of the displacement rinse tank 20, 52 gallons of solution was accommodated. In each of the first base tank 22 and the second base tank 23, 37.5 gallons of 6% NaOH solution was accommodated. In each of compartments A and B of the displacement rinse tank 24, 37.5 gallons of solution was accommodated.

The first portion of acid solution in the first tank 18 (the first cation regenerant solution) was fed into the strong acid cation exchange bed 7 at a rate of 2.5 gpm/ft$^3$ via the valve H4, the pump 21, and the valve H7 (the valve E1 was opened). When the level switch in the tank 18 was on, the valve H4 was closed and the valve H5 was opened, and acid solution accommodated in the second acid tank 19 (the second cation regenerant solution) was continuously fed into the system at a rate of 2.5 gpm/ft$^3$. When the level switch in the tank 19 was activated, the valve H5 was closed and valve R3 was opened. Displacement rinse accommodated in the compartment B (the first displacement rinse) of the tank 20 was continuously fed into the system at a rate of 2.5 gpm/ft$^3$. When the level switch in the compartment B was turned on, the valve R3 was closed and the valve R1 was opened, thereby feeding displacement rinse accommodated in the compartment A (the second displacement rinse) of the tank 20 into the bed 7. As the third displacement rinse, fresh rinse accommodated in the collection sump 2 was fed into the bed 7 from the bottom at a rate of 2.5 gpm/ft$^3$ via a pump 5', a filter 3', a flow meter 4', and valves S3 and C3. Meanwhile, the effluent was discharged from the top of the bed 7 via the valves C5 and E1, and when the level switch in the feed compartment 11 was turned on, i.e., the volume of the solution in the feed compartment corresponding to that of the first cation regeneration solution was discarded to the feed compartment, the valve E1 was closed, and the flow was diverted to the first acid tank 18 via the valve H1, thereby introducing the effluent of the second cation regeneration solution into the first acid tank 18. When the level switch in the tank 18 was turned on, the valve H1 was closed and the valve H2 was opened, thereby introducing the effluent of the first displacement rinse into the second acid tank 19, in which the chemical concentration was continuously adjusted to approximately 8% by adding acid thereto from the tank 16. When the level switch in the tank 19 was mined on, valve H2 was closed and valve H3 was opened, thereby introducing the effluent of the second displacement rinse into compartment B of the tank 20. The effluent in rinse into compartment B overflowed to compartment A, thereby introducing the effluent of the third displacement rinse into compartment A. In the same manner, the strong base anion exchange bed 8 was regenerated. The flow rate was 1.25 gpm/ft$^3$. The solution in the feed compartments 11 and 28 was transferred to the evaporator-holding tank 12 where the pH of the solution was adjusted and the solution was concentrated.

In the final rinse cycle, water was circulated in the system at a rate of 3 gpm/ft$^3$ for 10 minutes via the pump 5', the filter 3', the flow meter 4', the valves S3 and C1, the bed 7, the valve A1, the bed 8, the conductivity monitor 26, and the valves A9 and S7. The conductivity measured by the conductivity monitor 26 was changed from 1,000 µS.cm⁻ at the beginning to 2 µS.cm⁻. This level showed that the beds were regenerated.

While the beds 7 and 8 were in the regeneration cycle, the beds 13, 14, and 9 were in service. By comparing the conductivity measured by a conductivity monitor 30, indicating the final conductivity, and a conductivity monitor 29, indicating the conductivity prior to the weak acid cation exchange bed 9, the timing of regeneration of the weak acid cation exchange bed 9 could be determined. The regeneration of the weak acid cation exchange beds 9 and 15 was performed, independently of which pair of the beds (7 and 8, or 13 and 14) were in service. The regeneration of the weak acid cation exchange bed 9, for example, was performed as follows: The valves W1 and W7 were closed and valves W2 and W8 were opened so as to put the weak acid cation exchange bed 15 into service. Valves O3 and W9 were opened so as to expel the process water remaining in the bed 9 to the collection sump 2. The regeneration process for the bed 9 was basically the same as that for the bed 7. A valve H9 was used instead of the valve H7. The regeneration was conducted in a loop via the tanks 18/19/20, the pump 21, the valve H9, the bed 9, and a valve W5. The final rinse was conducted using the ongoing service flow through the bed 15, by opening the valve W1 for a fixed period of time sufficient to rinse the remaining regenerant from the bed 9. The rinse flows through the bed 9, the valves W9 and S8. The weak acid cation exchange bed 15 was subjected to regeneration in the same manner. The valves W2, W4, W6, W8, W0, O4, and H8 correspond to W1, W3, W8, W7, W9, O3, and H9, respectively.

Eventually, the volume of waste which underwent evaporation was 75 gallons, which was equivalent to 1 BV. As compared with conventional systems, this value was evaluated as a 92% reduction. In the above, the granular activated carbon bed 6 was separately washed with rinse via the pump 5', the filter 3', the flow meter 4', the valves S1 and G2, the bed 6, the valve G3, and the collection sump 2. When the strong acid cation exchange bed 13 and the strong base anion exchange bed 14 were exhausted, regeneration was performed in the same manner as above, in which the valves associated with the beds 13 and 14 correspond to the valves associated with the beds 7 and 8 as follows: O2/O1, O4/O3, S4/S3, G6/G5, C2/C1, C4/C3, C6/C5, A2/A1, A4/A3, A6/A5, A8/A7, A0/A9, and H6/H7.

EMBODIMENTS 4–8

Other Regeneration Systems

Figure 4:
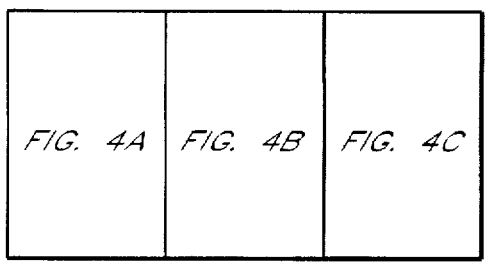
FIG. 4 is a schematic view showing an embodiment of counter-current up-flow regeneration of the present invention, in which a granular activated carbon bed, a pair of strong acid cation exchange beds, and a pair of strong base anion exchange beds are placed in series, wherein each one of the paired beds is in service and the other one is in regeneration process.
Figure 4A:
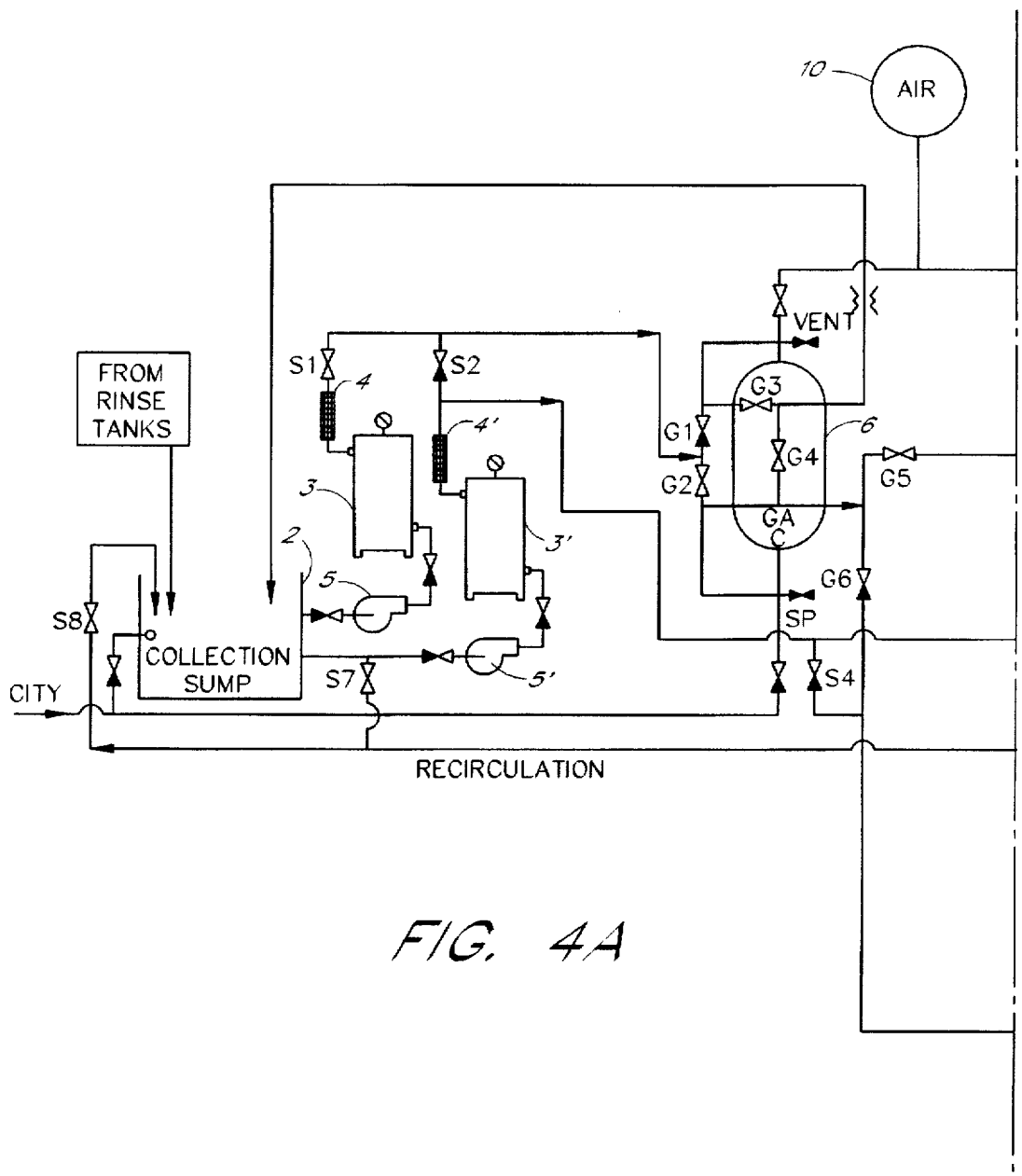
Figure 4B:
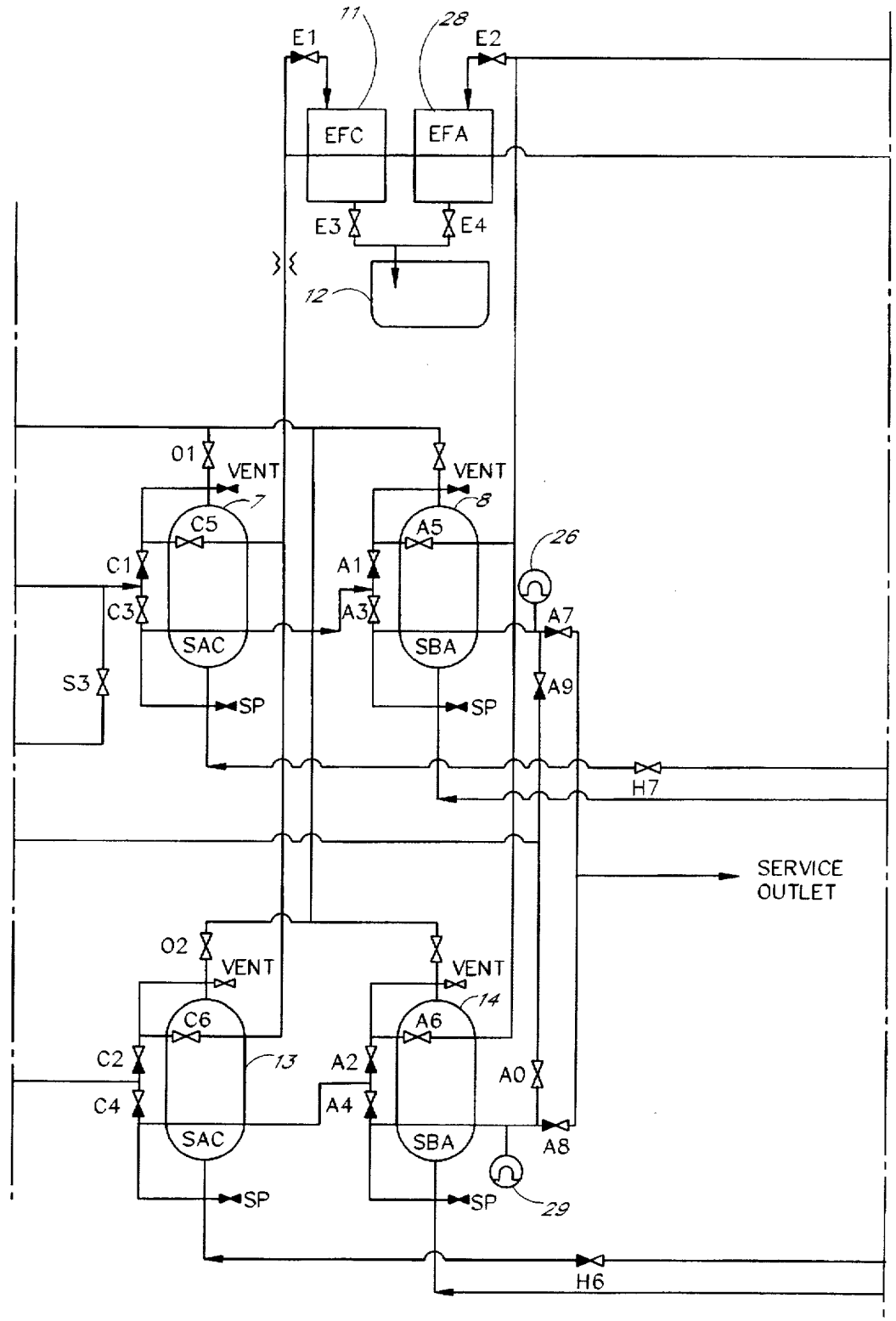
Figure 4C:
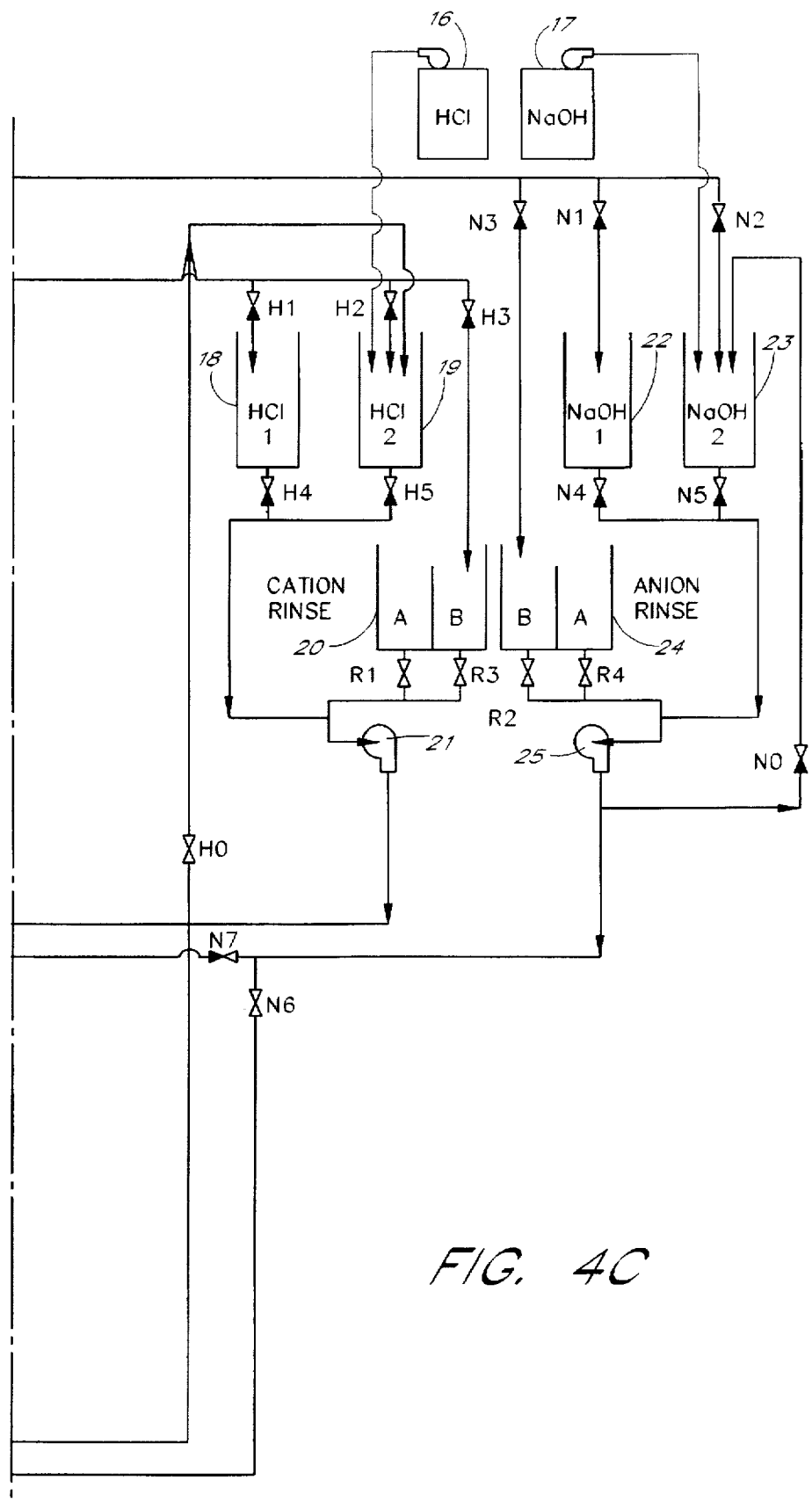
Figure 5:
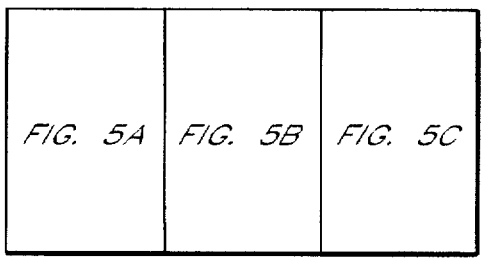
FIG. 5 is a schematic view showing an embodiment of counter-current up-flow regeneration of the present invention, in which a granular activated carbon bed, a cation exchange bed, and an anion exchange bed are placed in series.
Figure 5A:
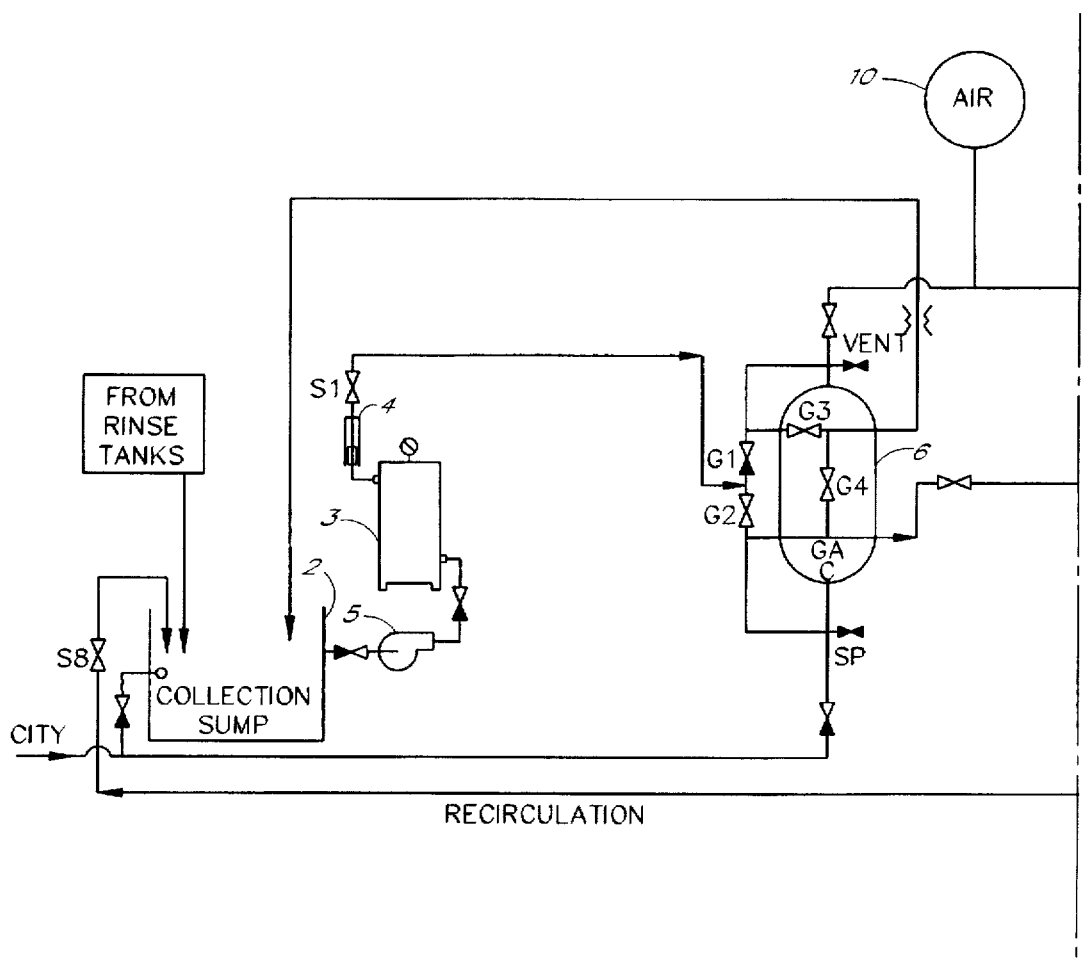
Figure 5B:
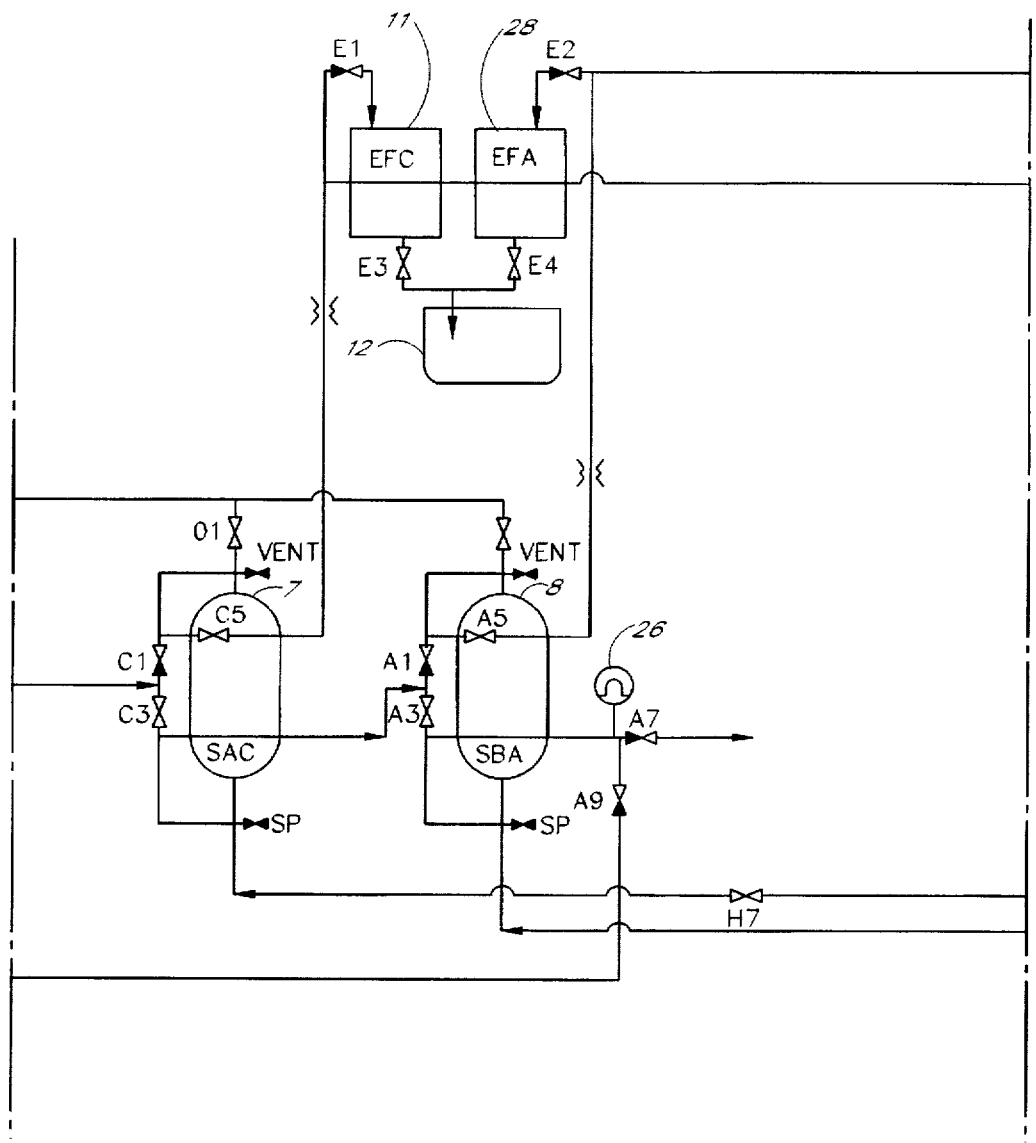
Figure 5C:
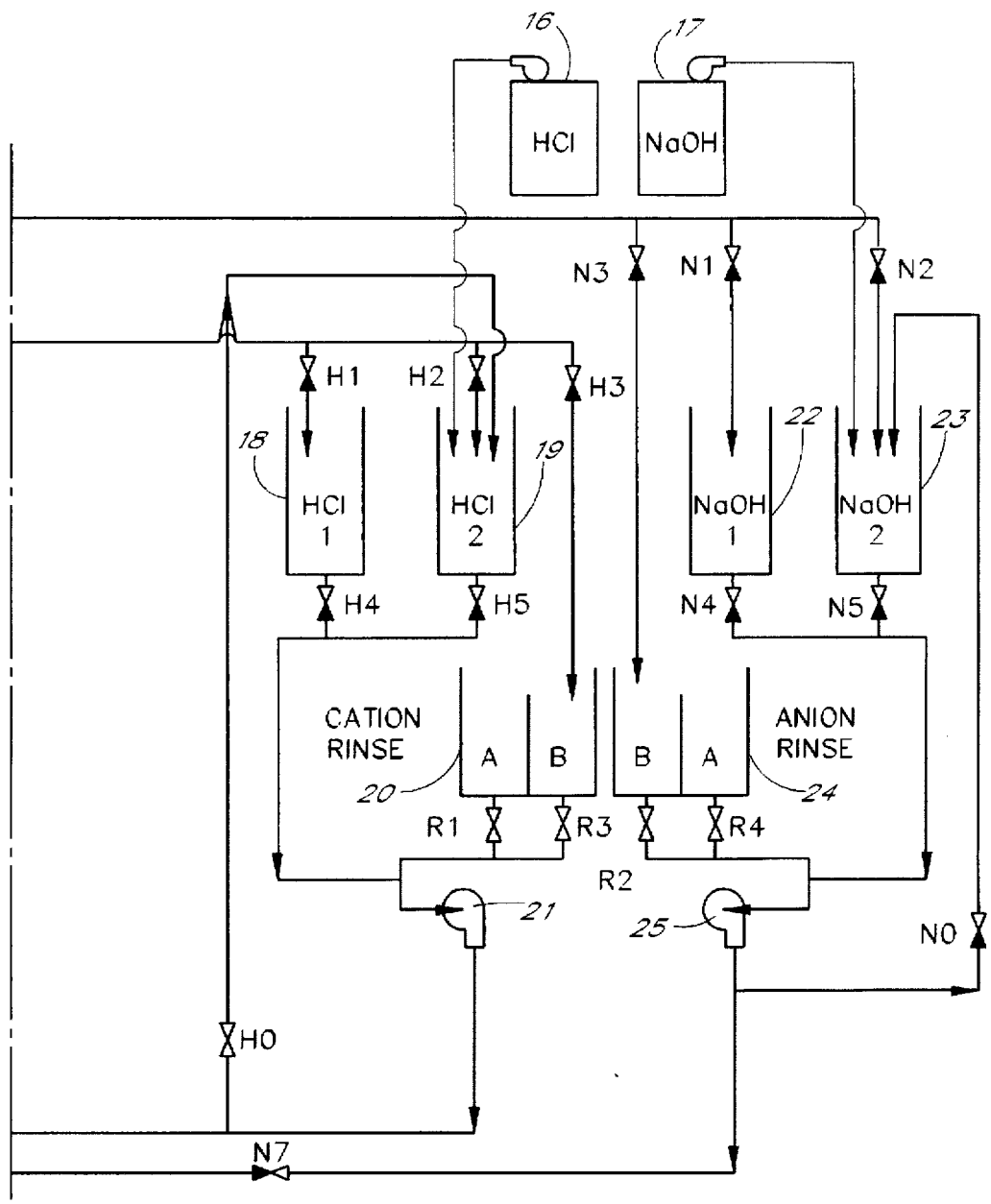
Figure 6:
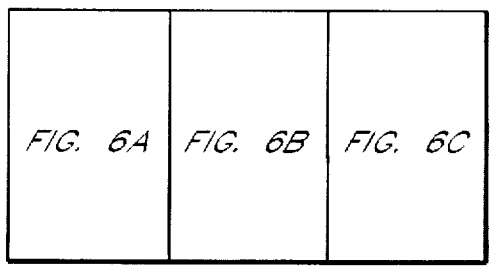
FIG. 6 is a schematic view showing an embodiment of counter-current up-flow regeneration of the present invention, in which a granular activated carbon bed, a strong acid cation exchange bed, a strong base anion exchange bed, and a weak acid cation exchange bed are placed in series.
Figure 6A:
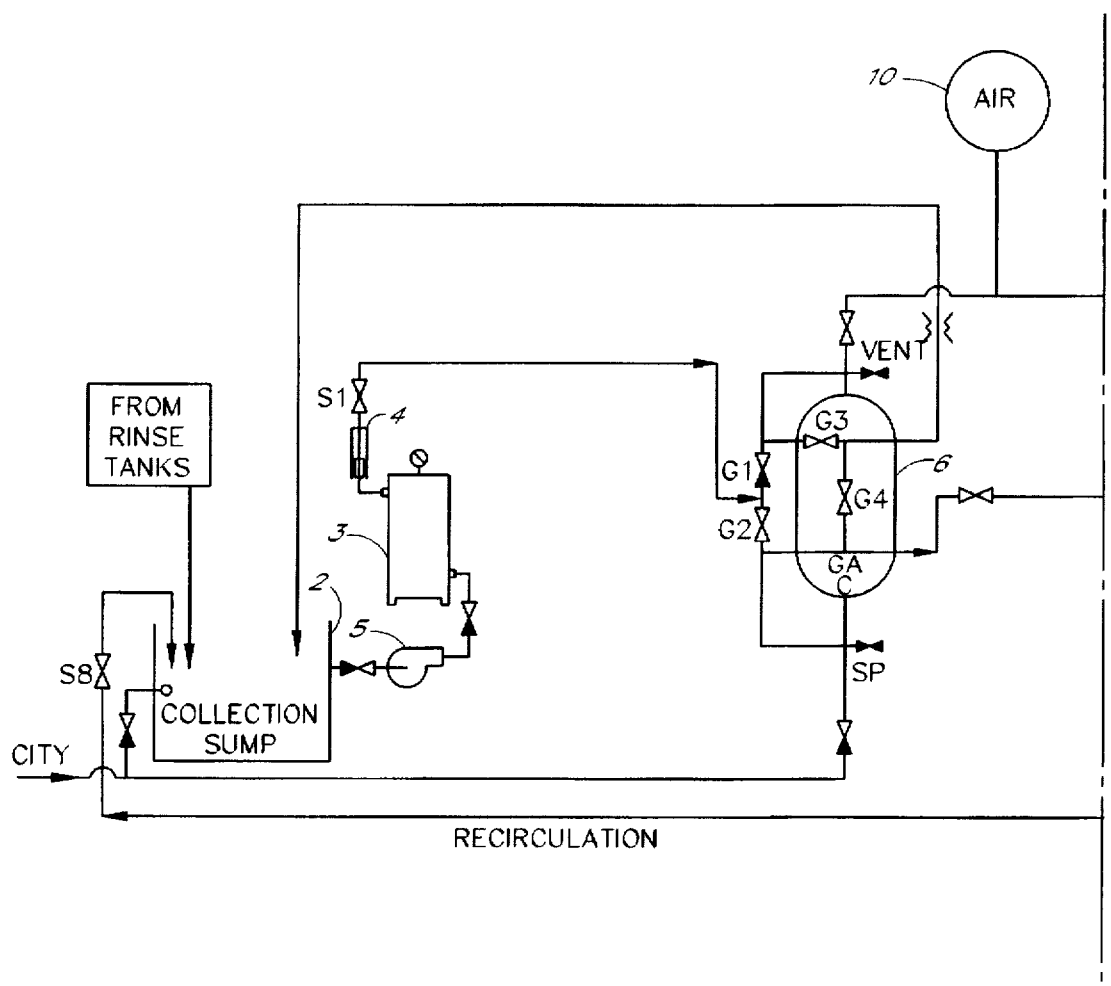
Figure 6B:
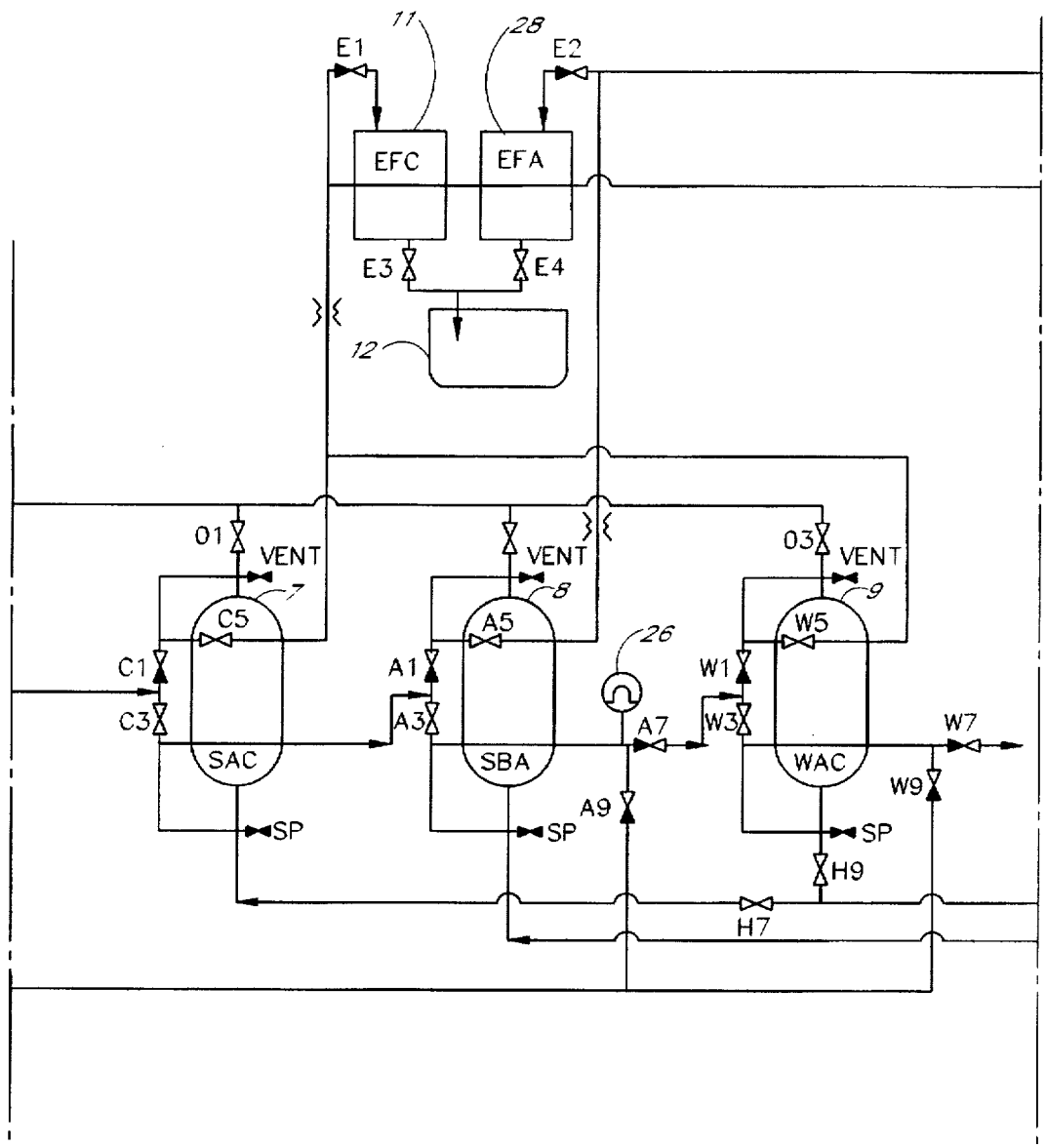
Figure 6C:
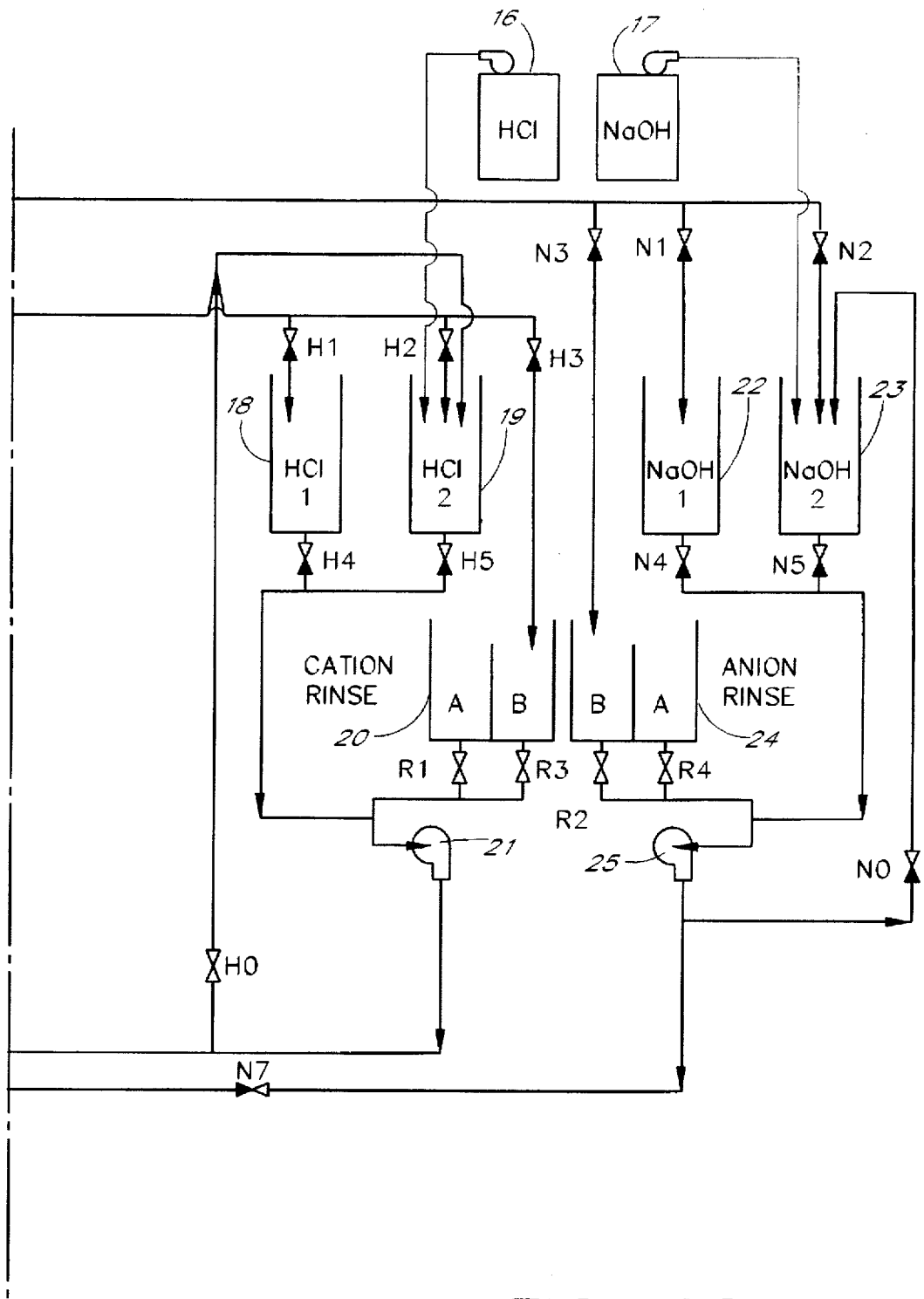
Figure 7:
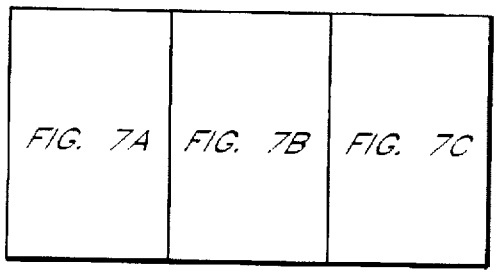
FIG. 7 is a schematic view showing an embodiment of counter-current down-flow regeneration of the present invention, in which a granular activated carbon bed, a cation exchange bed, and an anion exchange bed are placed in series.
Figure 7A:
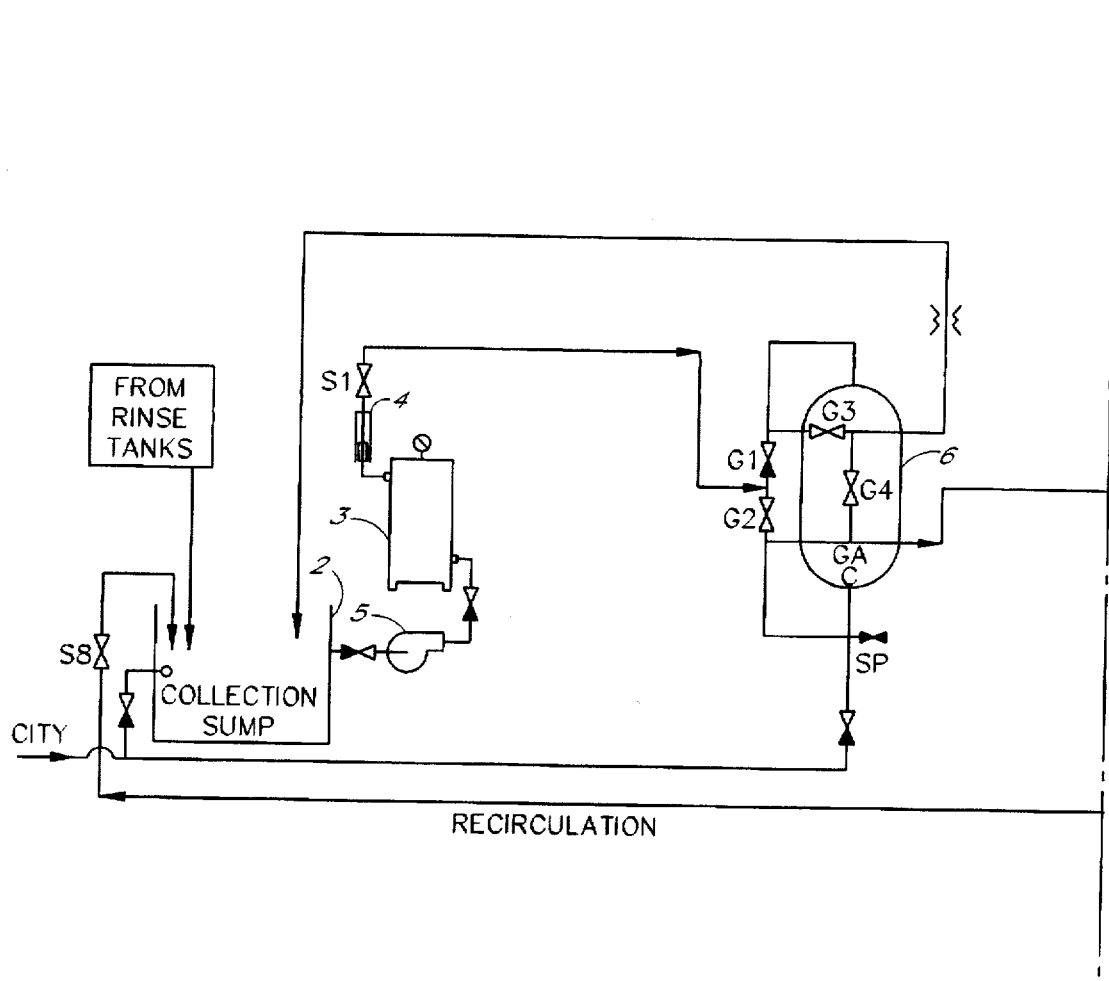
Figure 7B:
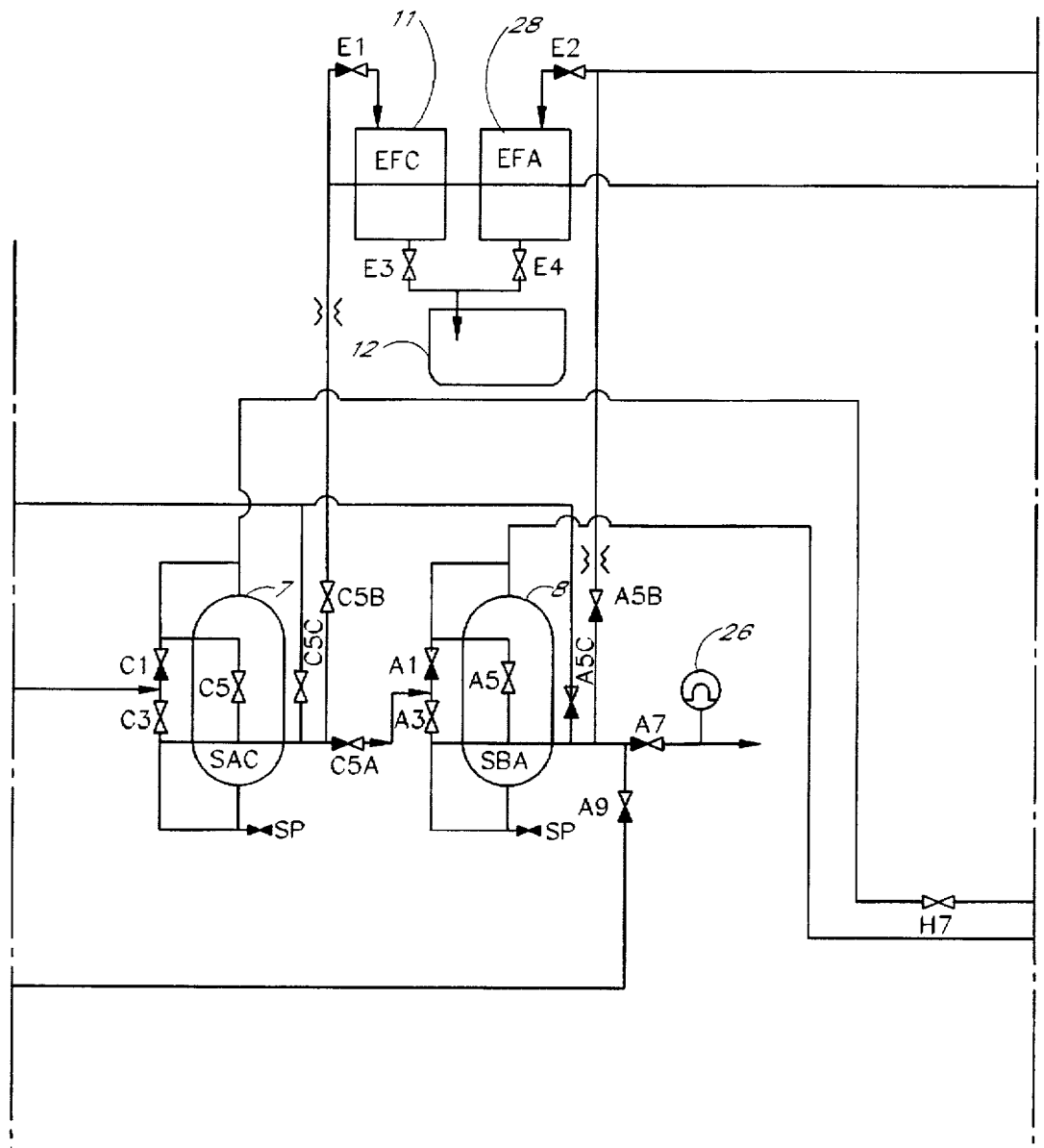
Figure 7C:
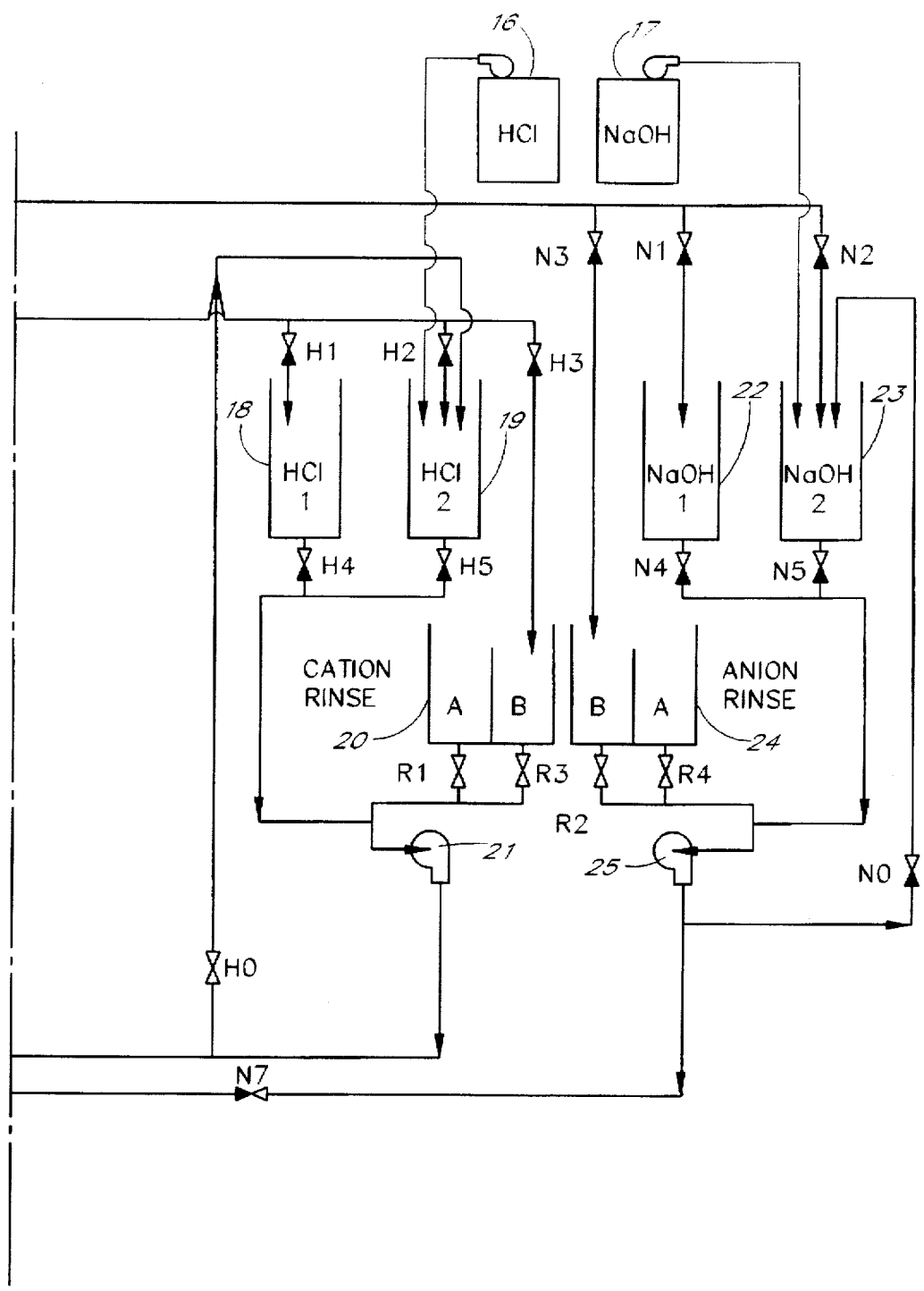
Figure 8:
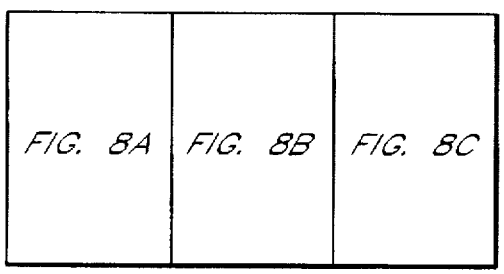
FIG. 8 is a schematic view showing an embodiment of co-current down-flow regeneration of the present invention, in which a granular activated carbon bed, a cation exchange bed, and an anion exchange bed are placed in series.
Figure 8A:
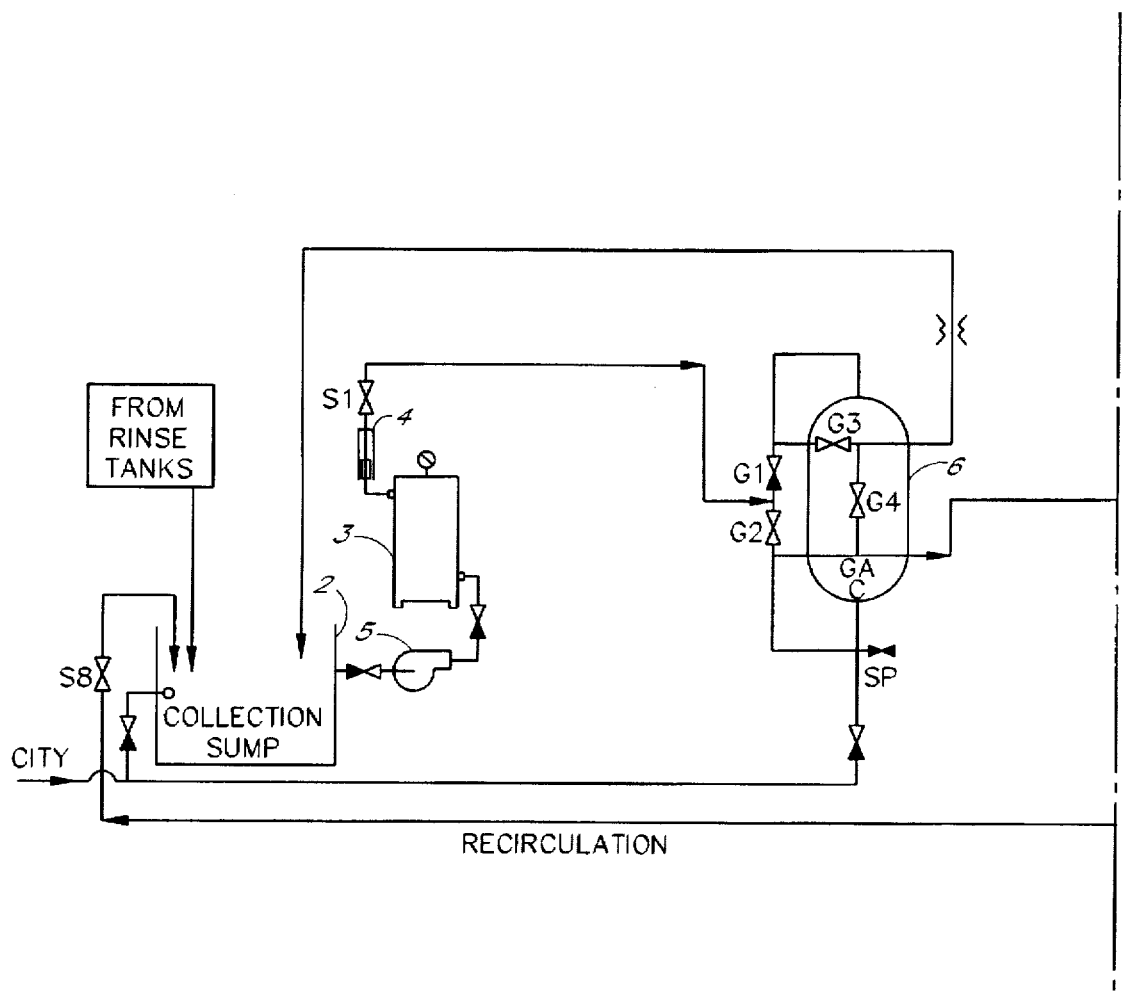
Figure 8B:
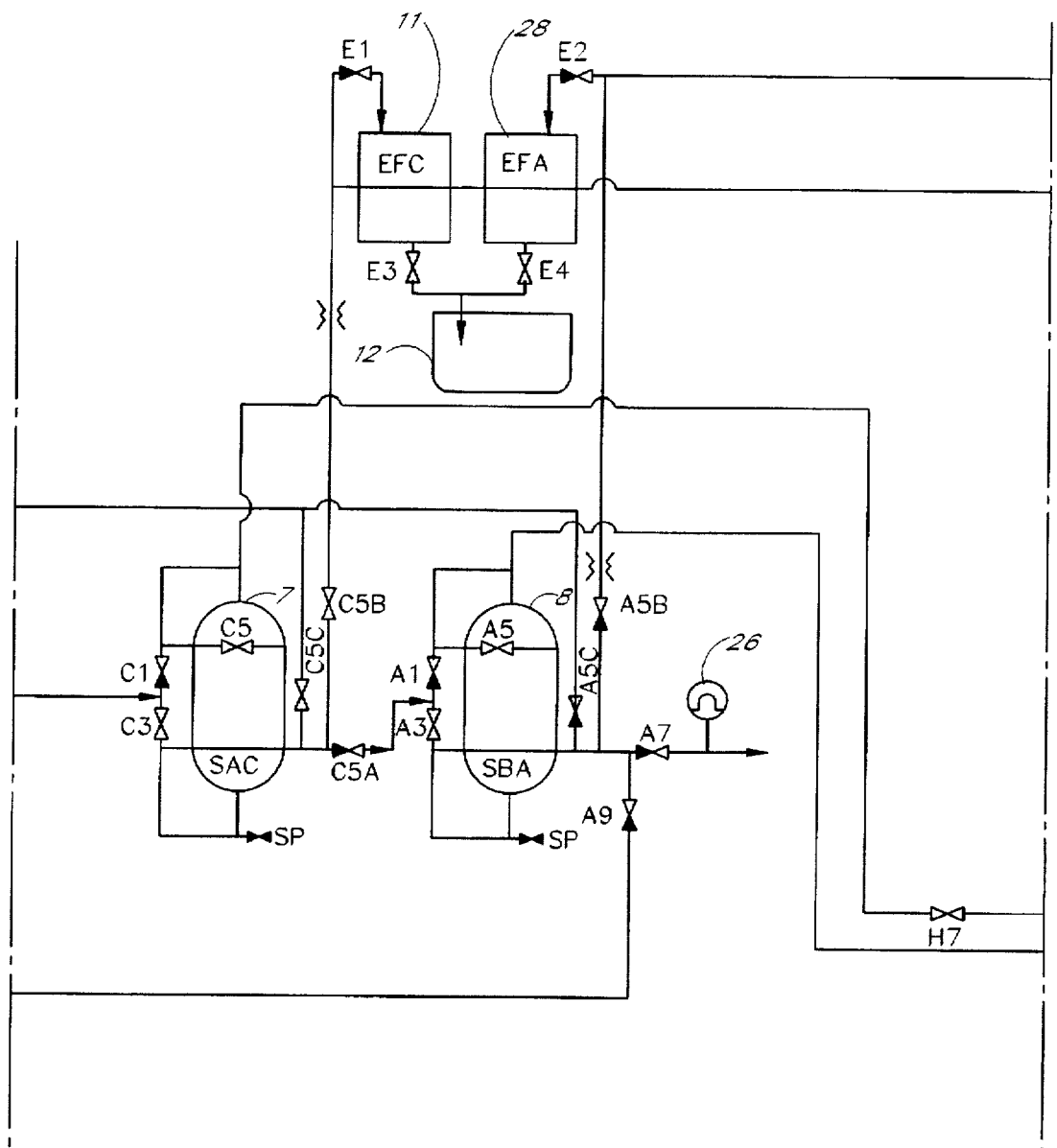
Figure 8C:
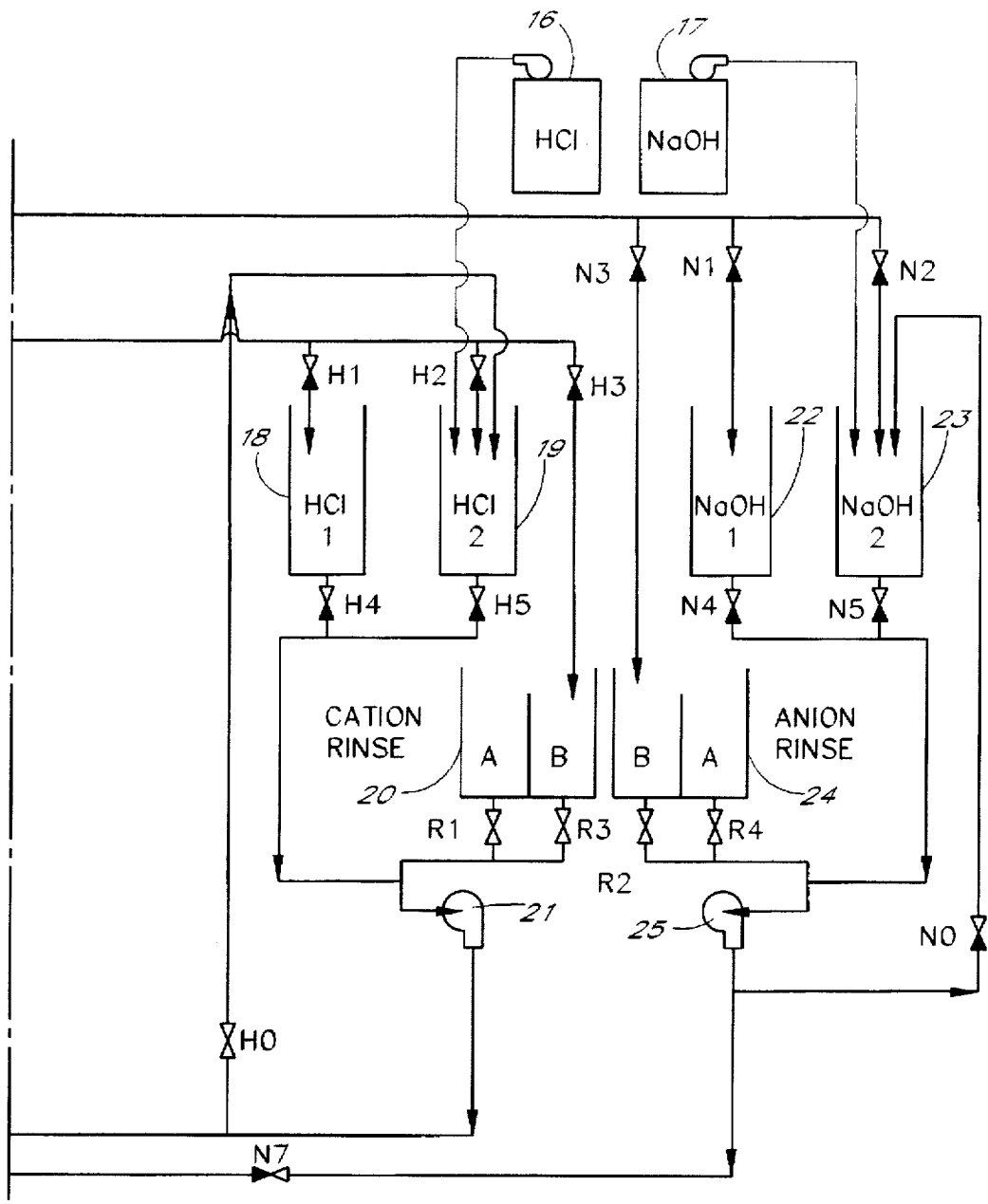

FIGS. 4–8 show Embodiments 4–8 of the present invention. FIG. 4 is a schematic view showing an embodiment of counter-current up-flow regeneration of the present invention, in which a granular activated carbon bed, a pair of strong acid cation exchange beds, and a pair of strong base anion exchange beds are placed in series, wherein each one of the paired beds is in service and the other one is in regeneration process. FIG. 5 is a schematic view showing an embodiment of counter-current up-flow regeneration of the present invention, in which a granular activated carbon bed, a cation exchange bed, and an anion exchange bed are placed in series. FIG. 6 is a schematic view showing an embodiment of counter-current up-flow regeneration of the present invention, in which a granular activated carbon bed, a strong acid cation exchange bed, a strong base anion exchange bed, and a weak acid cation exchange bed are placed in series. In the above, the operation of regeneration cycles can be conducted in a similar way to those in Embodiments 1–3. FIG. 7 is a schematic view showing an embodiment of counter-current down-flow regeneration of the present invention, in which a granular activated carbon bed, a cation exchange bed, and an anion exchange bed are placed in series. This embodiment is functionally the same as Embodiment 2 (FIG. 2), although the piping is slightly different. The service cycle is conducted via the valve C3, the bed 7, the valves C5, C5A, and A3, the bed 8, and the valves A5 and A7. The regeneration of the bed 7 is conducted via the valve H7, the bed 7, and a valve C5B, after the introduced regenerant pushes the backwash water remaining in the bed 7 back to the collection sump 2 via a valve C5C (i.e., after a few minutes). Valves A5B and A5C correspond to the valves C5B and C5C. FIG. 8 is a schematic view showing an embodiment of co-current down-flow regeneration of the present invention, in which a granular activated carbon bed, a cation exchange bed, and an anion exchange bed are placed in series. In the above co-current down-flow regeneration, for regeneration of the cation exchange bed 7, after backwash, the solution is expelled from the bed 7 to the collection sump 2 via the valve C5C while the valve C5C is open for a few minutes, by introducing regenerant to the bed 7 via the valve H7. The flow coming out of the bed 7 is switched between the valve C5A and the valve C5B. The regeneration of the anion exchange bed 8 is conducted in the same manner as that of the cation exchange bed 7, in which the valves A5B and A5C correspond to the valves C5B and C5C.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. A method for minimizing wastewater discharge generated in an ion exchange regeneration system comprising a cation exchange bed packed with cation exchange resin and an anion exchange bed packed with anion exchange resin, said method comprising the steps of:

(a) backwashing and regenerating said cation exchange bed by introducing thereto a first portion out of plural portions of cation regenerant solution, said plural portions being numbered from 1 to n, wherein n is an integer >1, in an up-flow direction at a rate sufficient to reclassify said resin accommodated in said bed and to regenerate said resin;

(b) further regenerating said cation exchange bed by introducing in sequence the remaining portions of cation regenerant solution thereto in an up-flow direction, the effluent of the first portion of cation regenerant solution being expelled from said cation exchange bed and separated from the regeneration cycle;

(c) saving the effluent of each portion, except the first portion, of cation regenerant solution to be used as a portion of cation regenerant solution in the subsequent cycle wherein portion number m is saved to be used as portion number m−1 in the subsequent cycle, wherein 2≦m≦n;

(d) displacing the cation regenerant solution present in said cation exchange bed by introducing thereto a displacement rinse consisting of plural portions being numbered from 1 to q, wherein q is an integer >1 and portion number q is provided by fresh rinse, in sequence in an up-flow direction; saving the effluent of the first portion of displacement rinse to be used as the last portion of cation regenerant solution in the subsequent cycle, the concentration of said last portion of cation regenerant solution being increased by adding thereto a cation regenerant concentrate; and saving the effluent of each of the remaining portions of displacement rinse to be used as a portion of displacement rinse in the subsequent cycle wherein portion number p is saved to be used as portion number p−1 in the subsequent cycle, wherein $2 \leq p \leq q$;

(e) backwashing and regenerating said anion exchange bed by introducing thereto a first portion out of plural portions of anion regenerant solution, said plural portions being numbered from 1 to n', wherein n' is an integer >1, in an up-flow direction at a rate sufficient to reclassify said resin accommodated in said bed and to regenerate said resin;

(f) further regenerating said anion exchange bed by introducing in sequence the remaining portions of anion regenerant solution thereto in an up-flow direction, the effluent of the first portion of anion regenerant solution being expelled from said anion exchange bed and separated from the regeneration cycle;

(g) saving the effluent of each portion of anion regenerant solution to be used as a portion of anion regenerant solution in the subsequent cycle wherein portion number m' is saved to be used as portion number m'−1 in the subsequent cycle, wherein $2 \leq m' \leq n'$;

(h) displacing the anion regenerant solution present in said anion exchange bed by introducing thereto a displacement rinse consisting of plural portions being numbered from 1 to q', wherein q' is an integer >1 and portion number q' is provided by fresh rinse, in sequence in an up-flow direction; saving the effluent of the first portion of displacement rinse to be used as the last portion of anion regenerant solution in the subsequent cycle, the concentration of said last portion of anion regenerant solution being increased by adding thereto an anion regenerant concentrate; and saving the effluent of each of the remaining portions of displacement rinse to be used as a portion of displacement rinse in the subsequent cycle wherein portion number p' is saved to be used as portion number p'−1 in the subsequent cycle, wherein $2 \leq p' \leq q'$;

(i) circulating a final rinse through said cation exchange bed and said anion exchange bed in series in a down-flow direction, wherein said cation exchange bed is placed upstream and said anion exchange bed is placed downstream; and (j) recirculating said final rinse until the quality of rinse discharged from either cation or anion exchange bed reaches a predetermined level.

2. The method for minimizing wastewater discharge according to claim 1, wherein steps (a) through (d) are performed simultaneously with steps (e) through (h).

3. The method for minimizing wastewater discharge according to claim 1, wherein, in step (a), n is 2.

4. The method for minimizing wastewater discharge according to claim 1, wherein, in step (d), q is 3.

5. The method for minimizing wastewater discharge according to claim 1, wherein, in step (e), n' is 2.

6. The method for minimizing wastewater discharge according to claim 1, wherein, in step (h), q' is 3.

7. The method for minimizing wastewater discharge according to claim 1, further comprising, prior to each of steps (a) and (e), purging water present in each of the cation and anion exchange beds, in a downward direction with air.

8. The method for minimizing wastewater discharge according to claim 1, further comprising filtering out impurities from service flow prior to the regeneration cycle.

9. The method for minimizing wastewater discharge according to claim 1, wherein said ion exchange regeneration system further comprises a bed selected from the group consisting of:

a metal-selective resin bed preceding said cation exchange bed;

a mixed-bed type polisher bed following said anion exchange bed;

a weak base anion exchange bed preceding said anion exchange bed; and a weak acid cation exchange bed following said anion exchange bed, wherein steps corresponding to steps (a) to (d) or steps (e) to (h) are performed on said bed, and, in step (i), said final rinse is further circulated through said bed.

10. The method of claim 9, wherein said ion exchange regeneration system further comprises a plurality of said beds, and wherein, in step (i), said final rinse is circulated through said beds in series.

11. The method for minimizing wastewater discharge according to claim 1, wherein, in steps (a) and (b), in steps (e) and (f), and in steps (d) and (h), the introduction of said cation regenerant solution, said anion regenerant solution, and said displacement rinse, respectively, is conducted by pulse flow.

12. The method for minimizing wastewater discharge generated in an ion exchange regeneration system according to claim 1, wherein, in step (b), the volume of said effluent of said first portion is equal to approximately that of said cation exchange bed, and, in step (f), the volume of said effluent of said first portion is equal to approximately that of said anion exchange bed.

13. A method for minimizing wastewater discharge generated in an ion exchange regeneration system comprising a cation exchange bed accommodating cation exchange resin and an anion exchange bed accommodating anion exchange resin, said method comprising the steps of:

(a) backwashing said cation and anion exchange beds by circulating backwash rinse through said cation and anion exchange beds in series in an up-flow direction, and recirculating said backwash rinse;

(b) regenerating said cation exchange bed by introducing thereto a first portion out of plural portions of cation regenerant solution, said plural portions being numbered from 1 to n, wherein n is an integer >1, from an upper part of the resin accommodated therein in a down-flow direction, the backwash rinse remaining in said cation exchange bed being expelled therefrom and separated from the regeneration cycle;

(c) further regenerating said cation exchange bed by introducing in sequence the remaining portions of cation regenerant solution thereto in a down-flow direction, the effluent of the first portion of cation regenerant solution being expelled from said bed and separated from the regeneration cycle;

(d) saving each portion, except the first portion, of cation regenerant solution to be used as a portion of cation regenerant solution in the subsequent cycle wherein portion number m is saved to be used as portion number m−1 in the subsequent cycle, wherein $2 \leq m \leq n$;

(e) displacing the cation regenerant solution present in said cation exchange bed by introducing thereto a displacement rinse consisting of plural portions being numbered from 1 to q, wherein q is an integer >1 and portion number q is provided by fresh rinse, in sequence in a down-flow direction; saving the effluent of the first portion of displacement rinse to be used as the last portion of cation regenerant solution in the subsequent cycle, the concentration of said last portion of cation regenerant solution being increased by adding thereto a cation regenerant concentrate; and saving the effluent of each of the remaining portions of displacement rinse to be used as a portion of displacement rinse in the subsequent cycle wherein portion number p is saved to be used as portion number p−1 in the subsequent cycle, wherein $2 \leq p \leq q$;

(f) regenerating said anion exchange bed by introducing thereto a first portion out of plural portions of anion regenerant solution, said plural portions being numbered from 1 to n', wherein n' is an integer >1, from an upper part of the resin accommodated therein in a down-flow direction, the backwash rinse remaining in said anion exchange bed being expelled therefrom and separated from the regeneration cycle;

(g) further regenerating said anion exchange bed by introducing in sequence the remaining portions of anion regenerant solution thereto in a down-flow direction, the effluent of the first portion of anion regenerant solution being expelled from said bed and separated from the regeneration cycle;

(h) saving each portion of anion regenerant solution to be used as a portion of anion regenerant solution in the subsequent cycle wherein portion number m' is saved to be used as portion number m'−1 in the subsequent cycle, wherein $2 \leq m' \leq n'$;

(i) displacing the anion regenerant solution present in said anion exchange bed by introducing thereto a displacement rinse consisting of plural portions being numbered from 1 to q', wherein q' is an integer >1 and portion number q' is provided by fresh rinse, in sequence in a down-flow direction; saving the effluent of the first portion of displacement rinse to be used as the last portion of anion regenerant solution in the subsequent cycle, the concentration of said last portion of anion regenerant solution being increased by adding thereto an anion regenerant concentrate; and saving the effluent of each of the remaining portions of displacement rinse to be used as a portion of displacement rinse in the subsequent cycle wherein portion number p' is saved to be used as portion number p'−1 in the subsequent cycle, wherein $2 \leq p' \leq q'$;

(j) circulating a final rinse through said cation exchange bed and said anion exchange bed in series in a down-flow direction, wherein said cation exchange bed is placed upstream and said anion exchange bed is placed downstream; and (k) recirculating said final rinse until the quality of rinse discharged from either cation or anion exchange bed reaches a predetermined level.

14. The method for minimizing wastewater discharge according to claim 13, wherein steps (b) through (e) are performed simultaneously with steps (f) through (i).

15. The method for minimizing wastewater discharge according to claim 13, wherein, in step (b), n is 2.

16. The method for minimizing wastewater discharge according to claim 13, wherein, in step (f), n' is 2.

17. The method for minimizing wastewater discharge according to claim 13, wherein, in step (e), q is 3.

18. The method for minimizing wastewater discharge according to claim 13, wherein, in step (i), q' is 3.

19. The method for minimizing wastewater discharge according to claim 13, wherein said ion exchange regeneration system further comprises a filtration device to filter out impurities from the service flow, prior to the regeneration cycle.

20. The method for minimizing wastewater discharge according to claim 13, wherein, in steps (b) and (f), the separated effluent of backwash is saved to be used as part of the final rinse.

21. The method for minimizing wastewater discharge according to claim 13, wherein said ion exchange regeneration system further comprises one or more of the following beds:

a metal-selective resin bed preceding said cation exchange bed;

a mixed-bed type polisher bed following said anion exchange bed;

a weak base anion exchange bed preceding said anion exchange bed; and a weak acid cation exchange bed following said anion exchange bed, wherein steps corresponding to steps (b) to (e) or steps (f) to (i) are performed on said one or more beds, and, in step (j), said final rinse is further circulated through said one or more columns in series.

22. The method for minimizing wastewater discharge generated in an ion exchange regeneration system according to claim 13, wherein, in step (c), the volume of said effluent of said first portion is equal to approximately that of said cation exchange bed, and, in step (g), the volume of said effluent of said first portion is equal to approximately that of said anion exchange bed.

* * * * *

UNITED STATES PATENT AND TRADEMARK OFFICE
CERTIFICATE OF CORRECTION

PATENT NO. : 5,718,828
DATED : February 17, 1998
INVENTOR(S) : Juzer Jangbarwala and Charles F. Michaud It is certified that error appears in the above-identified patent and that said Letters Patent is hereby corrected as shown below:

Column 5/line 23, delete "onion" and insert --anion--;

Column 14/line 14, delete "Regeneration" and insert --Regenerant--;

Column 22/line 18, delete "derailed" and insert --detailed--;

Column 24/line 54, delete "mined" and insert --turned--;

Column 25/line 32, delete "W8" and insert --W5--;

Column 30/line 46, delete "(c)" and insert --(b).

Signed and Sealed this

Eighth Day of December, 1998

*Attest:*

BRUCE LEHMAN

*Attesting Officer*  Commissioner of Patents and Trademarks